(12) United States Patent
Hoyles et al.

(10) Patent No.: US 8,053,707 B2
(45) Date of Patent: *Nov. 8, 2011

(54) BARBECUE GRILL

(75) Inventors: Victor Hoyles, Kitchener (CA); Kristoffer Hess, Cambridge (CA)

(73) Assignee: Dimplex North America Limited, Cambridge, ON (CA)

( * ) Notice: Subject to any disclaimer, the term of this patent is extended or adjusted under 35 U.S.C. 154(b) by 1027 days.

This patent is subject to a terminal disclaimer.

(21) Appl. No.: 11/855,748

(22) Filed: Sep. 14, 2007

(65) Prior Publication Data

US 2008/0164246 A1    Jul. 10, 2008

Related U.S. Application Data

(63) Continuation-in-part of application No. 11/620,906, filed on Jan. 8, 2007.

(51) Int. Cl.
*A47J 37/06* (2006.01)
*A47J 37/07* (2006.01)
*H05B 3/66* (2006.01)
*H01R 13/66* (2006.01)
*H01R 13/73* (2006.01)

(52) U.S. Cl. .................. 219/404; 219/398; 219/452.13; 219/464.1

(58) Field of Classification Search ........................ None
See application file for complete search history.

(56) References Cited

U.S. PATENT DOCUMENTS

| | | |
|---|---|---|
| 1,717,269 A | 6/1929 | Shroyer |
| 2,812,706 A | 11/1957 | Del Francia et al. |
| 3,252,407 A | 5/1966 | Buerki |
| 3,281,575 A | 10/1966 | Ferguson, Jr. |
| 3,369,481 A | 2/1968 | Pappas |
| 3,623,422 A | 11/1971 | Marshall |
| 3,693,538 A | 9/1972 | Synder |
| 3,982,476 A * | 9/1976 | McLane ........................ 99/339 |
| 4,034,663 A | 7/1977 | Jenn et al. |
| D253,804 S * | 1/1980 | Wandel ........................ D7/332 |
| D261,600 S * | 11/1981 | Langtry ........................ D7/391 |
| 4,321,857 A * | 3/1982 | Best ............................... 99/340 |
| D265,162 S * | 6/1982 | Bales ............................ D7/336 |
| 4,917,006 A | 4/1990 | Bowen et al. |
| 4,979,440 A | 12/1990 | Latour et al. |
| 5,105,725 A | 4/1992 | Haglund |
| 5,184,540 A * | 2/1993 | Riccio ......................... 99/421 H |
| 5,361,685 A * | 11/1994 | Riccio ......................... 99/421 H |
| 5,431,093 A * | 7/1995 | Dodgen ........................ 99/427 |
| 5,465,653 A * | 11/1995 | Riccio ......................... 99/421 H |
| 5,467,691 A | 11/1995 | Koziol |

(Continued)

FOREIGN PATENT DOCUMENTS

GB    2 424 360    9/2006

OTHER PUBLICATIONS

Firestone Cook Number Electric Grill Video [online], retrieved from Internet using URL: www.firestonehp.com/cooknumber_video.html.

(Continued)

*Primary Examiner* — Joseph M Pelham

(57) ABSTRACT

A barbecue grill for cooking an object. The barbecue grill includes a first resistive element subassembly energizable for generating heat to cook the object, and a second resistive element subassembly energizable for generating heat to cook the object.

6 Claims, 31 Drawing Sheets

U.S. PATENT DOCUMENTS

| | | | |
|---|---|---|---|
| D364,995 S | 12/1995 | Koziol | |
| 5,488,897 A | 2/1996 | Snyder | |
| 5,536,518 A * | 7/1996 | Rummel | 426/523 |
| 5,611,264 A | 3/1997 | Studer | |
| 5,655,437 A * | 8/1997 | Vitacca | 99/400 |
| 5,720,217 A * | 2/1998 | Pappas | 99/421 H |
| 5,799,569 A * | 9/1998 | Moreth | 99/421 H |
| D414,074 S | 9/1999 | Jalayer | |
| 5,974,952 A * | 11/1999 | Riccio | 99/339 |
| 6,079,322 A * | 6/2000 | Su | 99/421 H |
| 6,167,800 B1 * | 1/2001 | Su | 99/421 H |
| 6,178,879 B1 * | 1/2001 | Park | 99/421 H |
| 6,182,560 B1 * | 2/2001 | Andress | 99/400 |
| 6,186,054 B1 | 2/2001 | Hung | |
| 6,257,128 B1 * | 7/2001 | Chen | 99/421 H |
| 6,260,478 B1 | 7/2001 | Harneit | |
| 6,268,592 B1 | 7/2001 | Hu et al. | |
| 6,279,462 B1 * | 8/2001 | Kim | 99/327 |
| 6,330,851 B1 * | 12/2001 | Riesselmann | 99/339 |
| 6,392,205 B1 | 5/2002 | Minonishi | |
| 6,405,640 B1 * | 6/2002 | Moreth | 99/334 |
| 6,408,742 B1 * | 6/2002 | Backus et al. | 99/421 H |
| 6,418,835 B1 * | 7/2002 | Lin | 99/421 H |
| 6,425,318 B1 * | 7/2002 | Kim | 99/327 |
| 6,450,087 B2 * | 9/2002 | Backus et al. | 99/427 |
| 6,474,224 B1 * | 11/2002 | Natter | 99/421 A |
| 6,536,334 B2 * | 3/2003 | Backus et al. | 99/421 H |
| 6,539,843 B2 * | 4/2003 | Andress | 99/385 |
| 6,568,315 B2 * | 5/2003 | Backus et al. | 99/421 H |
| 6,568,316 B1 * | 5/2003 | Backus et al. | 99/421 H |
| 6,658,991 B2 * | 12/2003 | Backus et al. | 99/395 |
| 6,742,445 B2 * | 6/2004 | Backus et al. | 99/421 H |
| 6,782,805 B2 * | 8/2004 | Backus et al. | 99/421 H |
| 6,782,806 B2 * | 8/2004 | Backus et al. | 99/427 |
| 6,837,150 B2 * | 1/2005 | Backus et al. | 99/421 H |
| 6,844,529 B2 | 1/2005 | Grohs | |
| 6,874,408 B2 * | 4/2005 | Backus et al. | 99/327 |
| 6,931,985 B1 * | 8/2005 | Attie | 99/340 |
| 7,021,203 B2 * | 4/2006 | Backus et al. | 99/421 H |
| 7,225,729 B2 * | 6/2007 | Backus et al. | 99/339 |
| 7,225,730 B2 * | 6/2007 | Backus et al. | 99/419 |
| 7,301,127 B1 | 11/2007 | Derridinger, Jr. | |
| 7,424,849 B2 * | 9/2008 | Backus et al. | 99/421 H |
| 7,514,651 B2 * | 4/2009 | Popeil et al. | 219/392 |
| 7,626,142 B2 * | 12/2009 | Backus et al. | 219/403 |
| 7,739,948 B2 * | 6/2010 | Backus et al. | 99/340 |
| 2005/0051148 A1 | 3/2005 | Sung et al. | |
| 2008/0163763 A1 | 7/2008 | Hoyles et al. | |
| 2008/0178864 A1 | 7/2008 | Hoyles et al. | |

OTHER PUBLICATIONS

Kenyon Custom All Seasons Electric Grill [online], retrieved from Internet using URL: www.kenyonappliances.com/all_seas_grill.html.

United States Office Action dated Jun. 10, 2011, in connection with U.S. Appl. No. 11/620,906.

* cited by examiner

BARBECUE GRILL

This application is a continuation-in-part application of application Ser. No. 11/620,906, filed Jan. 8, 2007.

FIELD OF THE INVENTION

The present invention relates to a barbecue grill and a barbecue assembly including same.

BACKGROUND OF THE INVENTION

Electric barbecue grills are known. In general, it is difficult to provide sufficient radiated heat to cook the barbecued meat (or any other object to be cooked) to the extent required using known electric barbecue grills. Also, it is difficult to provide sufficient conducted heat through grill elements to create dark barbecue grill markings on the meat in known electrical barbecue grills. In particular, in known electric barbecue grills, providing the required amounts of such heat (i.e., radiated heat and conducted heat) in the appropriate proportions relative to each other has proven to be extremely difficult to achieve.

In known electric barbecues, the manner in which grease and other liquids released from the barbecued object during barbecuing are dealt with also appears to have been problematic. For instance, U.S. Pat. No. 5,488,897 (Snyder) discloses a structure in which an electric heating element is mounted onto an aluminium heater plate, which is attached to the bottom of an extruded or cast aluminium cooking grid with a number of grill elements. A food product to be barbecued is positioned on the grill elements, and heated. In Snyder, however, grease and other liquids from the barbecued product are not allowed to fall between the grill elements. Instead, in the Snyder invention, grease and other liquids are collected off the top surfaces of the grid and then directed away from the grid (and the electric heating element), instead of falling through the grid.

Another prior art barbecue grill is disclosed in U.S. Pat. No. 5,105,725 (Haglund). Unlike the grid disclosed in Snyder, the grid element (68) in Haglund includes "vent holes" (10) which are described as permitting hot gases generated by a heat source beneath the grid to pass upwardly, permitting "a certain amount" of liquid from the food product to pass therethrough, and also permitting thermal expansion and contraction of the grid (col. 5, lines 66-68 and col. 6, line 1-8). The grid element is intended for use in a variety of barbecues, including barbecues with "electrical heating elements" (col. 1, lines 13-16).

The vent holes in the Haglund grid are arranged in a "staggered" pattern (col. 6, lines 33-39). The shapes of the openings may be as desired (col. 6, lines 47-56). However, the Haglund patent teaches that the overall area of the vent holes should be limited to between about 10 percent and about 25 percent of the total area of the "planar base" of the grid (col. 6, lines 57-66). This range is said "to provide a good balance", for the following reasons (col. 6, lines 66-68 and col. 7, lines 1-11):

If the base 4 collects too much fat, then the fat can ignite which chars the meat resting on the grill rails 8. Also, if an excessive area is provided by the vent holes 10, then it is possible for flames originating from below the base 4 to pass upwardly through the vent holes 10 and char the meat being cooked on the grill rails 8. A minimum area of solid base is also desirable in order to collect fat and other juices dripping from the meat and other food products being cooked on the grid element 2. The hot base 4 cooks the dripping fat and juices, and generates a certain amount of smoke and flavored gases which provide a "barbecue-type" flavor to the meat and other food products.

It appears that, in each of the grids disclosed in the Snyder and Haglund patents, a significant amount of grease and other liquids from a barbecued article would tend to remain on the prior art grid. However, as is known in the art, where grease and other liquids (and pieces of the barbecued food article) remain on the grid, they tend to become baked on the grid, ultimately adversely affecting the efficiency of the grid. Also, the accumulated materials may result in excessive smoke and other undesirable effects.

There is therefore a need for an improved barbecue grill which overcomes or mitigates one or more of the disadvantages of the prior art.

SUMMARY OF THE INVENTION

In its broad aspect, the invention provides a barbecue grill for cooking an object. The barbecue grill includes a first resistive element subassembly energizable for generating heat to cook the object and a second resistive element subassembly energizable for generating heat to cook the object.

In another of its aspects, the first and second resistive element subassemblies are energizable independently of each other.

In yet another of its aspects, the barbecue grill is adapted for self-cleaning.

In yet another of its aspects, the invention provides a barbecue assembly for cooking an object. The barbecue grill assembly includes a barbecue grill with first and second resistive element subassemblies, and a tub in which the barbecue grill is mounted, for supporting the barbecue grill in one or more predetermined positions.

In another aspect, the predetermined positions include one or more grill positions, in which the grill is located for grilling the object, and one or more broil positions, in which the grill is located for broiling the object.

In yet another aspect, the predetermined positions include one or more grill positions, in which the grill is located for grilling the object, and one or more raised positions, in which the grill is located at least partially above the grill position to permit cleaning of the tub.

In yet another of its aspects, the invention provides a connector assembly to provide an electrically conductive supply connection between a supply wire through which electric power is provided and a conductive distributor for distributing the electric power to one or more resistive elements for generating heat. The connector assembly includes a tube extending between inner and outer ends thereof, the inner end being proximal to the resistive elements, and the outer end being positioned distal thereto. A portion of the conductive distributor is positioned in the tube between the inner end thereof an intermediate position between the inner and outer ends. Also, the supply wire is positioned in the tube between the outer end and the intermediate position. The conductive distributor and the supply are electrically connected at the intermediate position to form the electrically conductive supply connection. The connector assembly also includes a thermal insulator for at least partially insulating the supply connection from heat generated by the resistive element(s).

BRIEF DESCRIPTION OF THE DRAWINGS

The invention will be better understood with reference to the attached drawings, in which.

DETAILED DESCRIPTION

Figure 1:
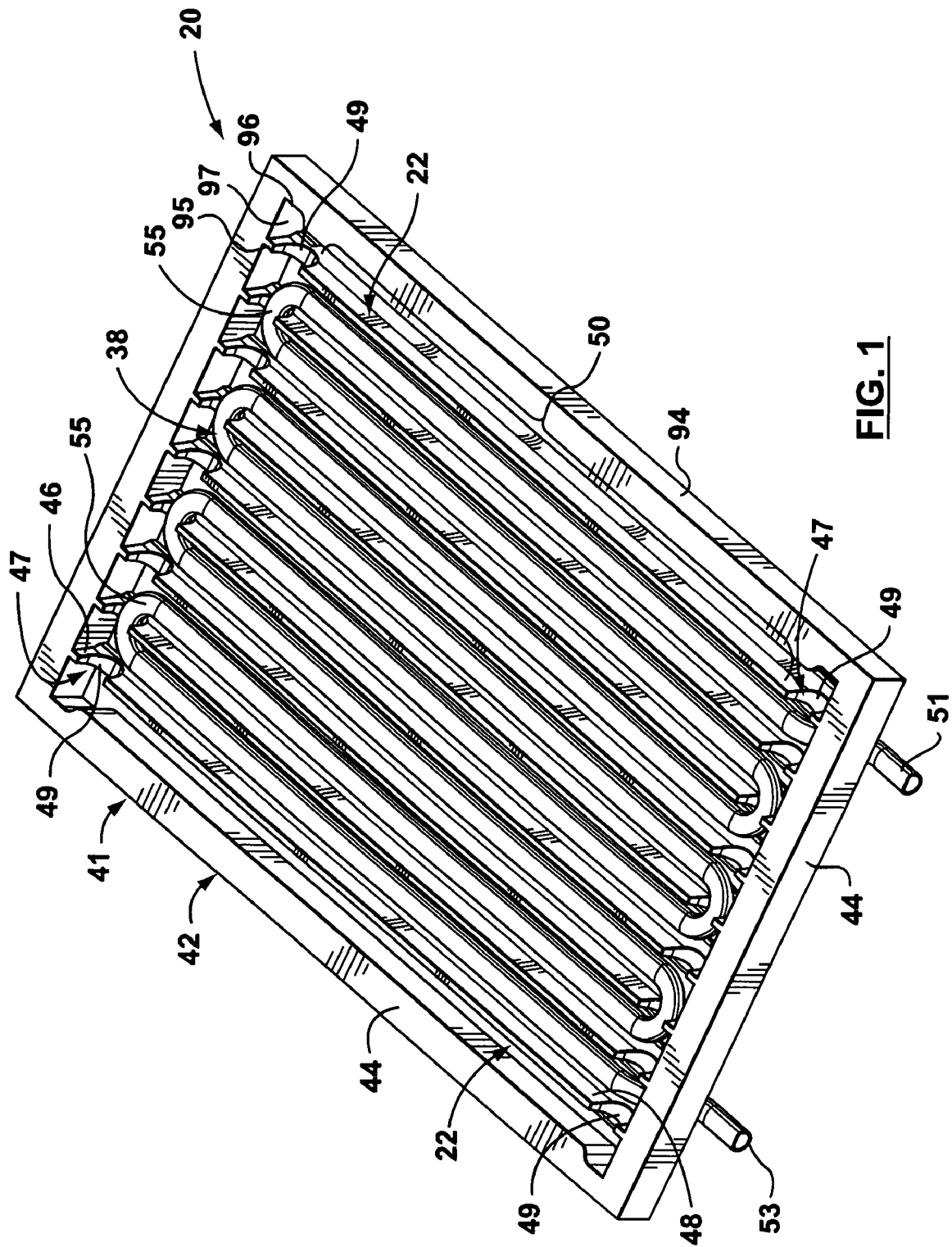
FIG. 1 is an isometric view of an upper side of an embodiment of a barbecue grill of the invention.
Figure 2A:
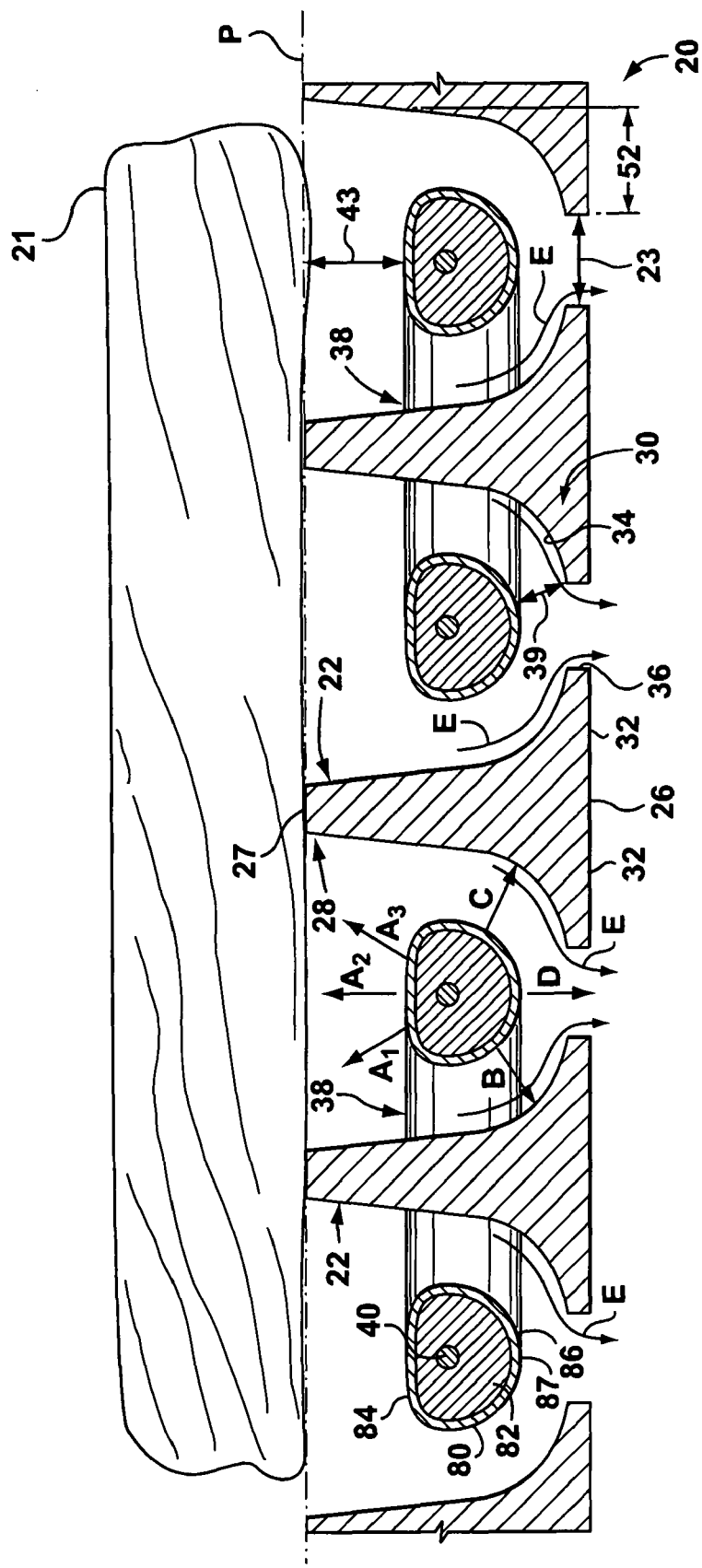
FIG. 2A is a cross-section of a portion of the barbecue grill of FIG. 1, drawn at a larger scale.
Figure 2B:
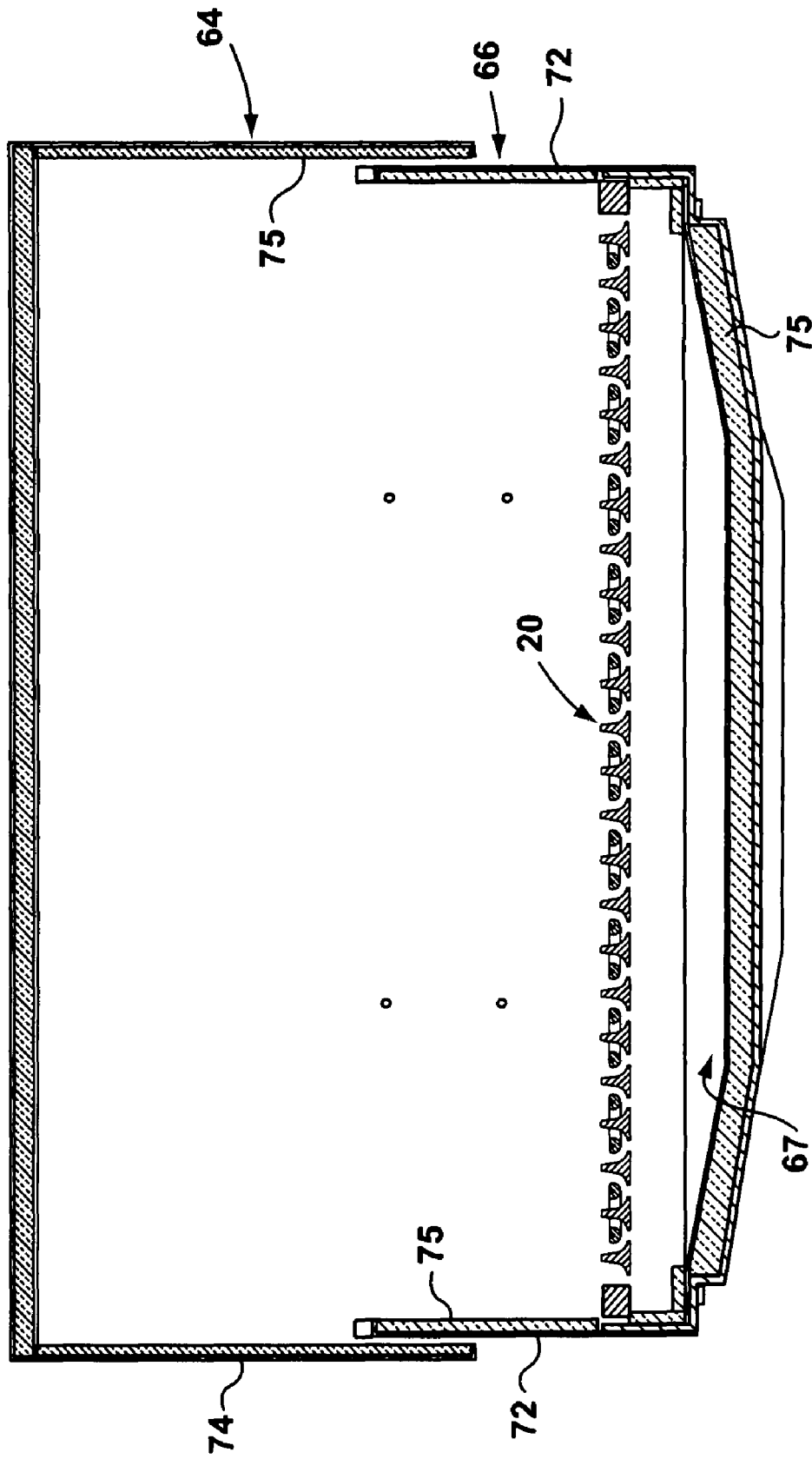
FIG. 2B is a cross-section of an embodiment of a barbecue assembly of the invention including the barbecue grill of FIG. 1, drawn at a smaller scale.

Reference is first made to FIGS. 1, 2A, and 2B to describe an embodiment of a barbecue grill in accordance with the invention indicated generally by the numeral 20. The barbecue grill 20 is for barbecuing an object 21 (FIG. 2A) which releases a liquid during barbecuing (i.e., cooking) thereof. The barbecue grill 20 comprises a number of elongate ribs 22 for supporting the object 21 which are spaced apart from each other by at least a first predetermined distance 23, as will be described. The barbecue grill 20 also includes one or more resistive element assemblies 38 for generating heat to barbecue the object positioned at a second predetermined distance 43 below the object 21 (FIG. 2A).

Preferably, the resistive element subassembly 38 is at least partially spaced apart from each rib 22 by a second predetermined distance 39 (at a minimum) to define a gap between the resistive element subassembly 38 and the adjacent rib 22, through which liquid from the barbecued object 21 moves under the influence of gravity.

It is preferred that the resistive element subassembly 38 includes an electrically resistive element 40 positioned inside a sheath 80. The resistive element 40 is electrically insulated from the sheath 80 by an electric insulator 82 disposed between the resistive element 40 and the sheath 80.

Sheathed elements are well known in the art, and it is therefore unnecessary to provide further details of the resistive element subassembly's construction, except as follows. In one embodiment, the sheath 80 is generally substantially circular in cross-section and the resistive element is coaxial with the sheath. However, it is also preferred that, in another embodiment, the sheath 80 is somewhat flattened in an upper side portion 84 thereof, so that the sheath 80 in the upper side portion 84 is proximal to the resistive element 40. As can be seen in FIG. 2A, it is preferred that a generally circular cross-section is formed by a lower side portion 86 of the sheath 80. Accordingly, the upper side portion 84 of the sheath 80 is closer to the resistive element 40 than the lower side portion 86 of the sheath 80. As a consequence of the asymmetrical cross-section configuration of the sheath 80, somewhat greater outward radiation of heat is provided from the upper side portion 84, such thermal radiation being directed generally upwardly (FIG. 2A), as will be described. Also, heat is radiated from the sheath 80 radially in substantially all directions, as will be described.

In one embodiment, each rib 22 includes a top surface 27 at a top end 28 of each rib 22 for supporting at least a portion of the object 21. Preferably, the top surfaces 27 substantially define a plane (designated as "P" in FIG. 2A). As shown in FIG. 2A, the resistive element subassembly 38 preferably is positioned the second predetermined distance 43 below the plane substantially defined by the top surfaces of the ribs 22 (FIG. 2A). Preferably, the second predetermined distance is so that the resistive element subassembly 38 is sufficiently close to the plane "P" to cook the object 21, however, without the subassembly 38 generally burning the object 21 due to direct thermal radiation.

As can be seen in FIG. 1, the barbecue grill 20 includes a grid portion 41 thereof having a frame 42 with one or more support members 44. The grid portion 41 also includes the ribs 22. Each rib 22 extends between a first end 46 and a second end 48 thereof, and the first and second ends 46, 48 are both attached to the support member 44. Preferably, and as shown in FIG. 1, the ribs 22 are positioned substantially parallel to each other.

FIG. 1 also shows that each rib 22 preferably includes vertically-oriented recesses 47 positioned at the first and second ends 46, 48. Each recess 47 is defined by a surface 49. Preferably, each surface 49 generally follows a portion of an arc formed to receive the lower side portion 86 of the sheath 80. In order to facilitate conduction of heat from the resistive element subassembly 38 to the rib 22, it is preferred that substantially the entire surface 49 engages an exterior surface 87 of the lower side portion 86 (FIG. 2A). Accordingly, the surface 49 preferably follows an arc curved in substantially the same way as the exterior surface 87 of the lower side portion 86 is curved, so that the surface 49 will generally closely fit with and engage the exterior surface 87 of the lower side portion 86.

Preferably, the resistive element subassembly 38 is continuous, extending from one end 51 thereof to another end 53 thereof. The ends 51, 53 are adapted for connection to a source of electrical power to the resistive element 40, as is known. The means for connecting the ends 51, 53 to the electrical power source are not illustrated as they are well known in the art. The resistive element subassembly 38 also preferably includes a plurality of corner portions 55. As shown in FIG. 1, the corner portions 55 are receivable in the recesses 47.

Preferably, the material out of which the grid portion 41 is made has a high heat tolerance, i.e., such material should be capable of withstanding temperatures of approximately 500° C. It is also preferred that the material of which the grid portion 41 is made has a reasonable ability to absorb heat through conduction and radiation. Finally, because of the need to scrape the grid portion 41 after use, it is also preferred that the grid portion 41 be made of material having sufficient durability to withstand repeated cleanings with metallic tools. The grid portion 41 may be made of any suitable material, e.g., cast iron, steel, or stainless steel. Also, those skilled in the art would appreciate that certain grades of aluminum which are relatively hard (e.g., aluminum grade 6061-T6) may be suitable.

As can be seen in FIGS. 1 and 2A, each rib 22 is adapted for receiving the object 21 on the top end 28 of the central portion 24 (and supporting the object 21), where the object 21 is heated by conduction of heat from the central portion 24, and by radiation of heat from the upper surface 34 of a ridge portion 30. Preferably, the upper surface 34 is configured to direct liquid released by the barbecued object toward an outer edge 36 thereof, as shown in FIG. 2A.

Preferably, one or more ridge portions 30 are positioned generally transverse to the central portion 24 and below the top end 28 of each rib 22. Each ridge portion 30 includes a lower surface 32 adjacent to a bottom end 26 of the central portion 24 and an upper surface 34 positioned above the lower surface 32. The outer edge 36 of the ridge portion 30 is positioned distal to the central portion 24 (FIG. 2A).

In order to facilitate more efficient heat transfer from the resistive element subassembly 38 to the central portion 24, the ridge portions 30 preferably are as thin as practicable. The ridge portions 30 should be sufficiently thick that they are durable, i.e. sufficiently substantial to withstand normal wear and tear.

Preferably, the gap 39 between the resistive element subassembly 38 and the ridge portion 30 is minimized, for more efficient heat transfer. However, the gap 39 should also be sufficiently large that grease (i.e., liquid) from the object 21 can pass through the gap 39, under the influence of gravity. Also, food particles typically fall off the object 21 from time to time, and it is preferred that the gap 39 be sufficiently large to permit most of such food particles to pass therethrough.

It is also preferred that the distance between adjacent ribs 22 should be minimized, in order to maximize the transfer of heat from the resistive element subassembly 38 to the ribs 22. However, the distance 23 between adjacent ribs 22 should also be sufficiently large to permit liquid (i.e., grease exiting the object 21 as it is cooked) and food particles to pass downwardly between adjacent ribs 22.

As can be seen in FIG. 1, the central portion 24 of each rib 22 includes a main segment 50 extending between the first and second ends 46, 48, and spaced apart from the first and second ends 46, 48. The ridge portions 30 of each rib 22 preferably extend laterally a preselected distance 52 from the central portion along the length of the main segment 50 (FIG. 2A).

The support members 44 preferably define a substantially rectangular or square frame 42, which (in one embodiment) include side support members 94 defining respective sides of the frame 42 (FIG. 1). Also, in this embodiment, the ribs 22 include terminal ribs 95 which are positioned adjacent to the respective side support members 94. Preferably, the outer edges of the ridge portions of the terminal ribs 95 are spaced apart from the side support members 94 by a distance which is about the same as the gap 23. As can be seen in FIG. 1, it is preferred that the side support members 94 include corresponding notches 96. Preferably, each of the notches 96 defines an opening 97 for permitting movement of liquid and food particles from the object therethrough by gravity. Primarily, the opening 97 is useful when the grill is cleaned (i.e., scraped) after use, as relatively larger food particles may be dislodged during cleaning.

However, most of the liquid and food particles fall between the ribs, i.e., the predetermined distance 23 has been found to be sufficiently large that most liquid and waste material from the object falls between the ribs. The openings 97 are useful primarily with respect to relatively large food particles which are dislodged when the grill is scraped to clean it after use. In one embodiment, the outer edge of each ridge portion 30 is spaced apart from each adjacent rib 22 by the predetermined distance 23 to permit drainage of the liquid from each upper surface 34 off the outer edge 36 thereof (FIG. 2A). The distance between adjacent ribs 22 should be minimized, in order to maximize the heat radiated onto the object 21. However, the distance 23 between adjacent ribs 22 should also be sufficiently large to permit liquid and food particles to pass downwardly between adjacent ribs 22. Preferably, each rib 22 extends about 0.5 inches between the top surface 27 and the bottom end 26. It has been determined that the optimal distance between adjacent ribs 22 is approximately 0.2 inches.

In use, the resistive element 40 generates heat when an electrical current is allowed to pass through the resistive element 40. Heat is transferred from the resistive element 40 through the electric insulator 82 by conduction, to cause the sheath 80 to become hot. As described above, the heat is radiated from the upper side portion 84 of the sheath 80 generally upwardly, i.e., generally toward the object 21 to be cooked, as schematically illustrated by arrows "$A_1$", "$A_2$", and "$A_3$" in FIG. 2A. However, heat also is radiated from the sheath 80 in other directions, as indicated by arrows "B", "C", and "D" in FIG. 2A. Accordingly, each rib 22 is heated, both by thermal radiation from the resistive element subassembly 38, and also through conduction, because the resistive element subassembly 38 is in direct contact with each rib 22 at the recess 47. Preferably, in order to facilitate heat transfer to the ribs 22 by thermal radiation, the ribs 22 are colored black. Heat is also transferred from the rib 22 to the object 21 by conduction at the top surface 27, where the object is in contact with the top surface. This results in lines of blackened or charred material (e.g., charred meat, if the object 21 is a piece of meat) in the object 21 where the object 21 contacts the top surface 27, which are generally desirable for showing that the object has been barbecued.

As can be seen in FIG. 2A, grease and other liquids released by the object 21 as it is barbecued move downwardly past the assembly 38, under the influence of gravity. The flow of such liquids due to gravity is schematically illustrated by arrows identified as "E" in FIG. 2A.

As shown in FIG. 2B, the barbecue grill 20 preferably is included in a barbecue assembly 64 which includes a housing 66 with a floor portion 67. The housing 66 also includes walls 72 extending upwardly from the floor portion 67 and an openable lid 74, all of which preferably are insulated (as will be described), to minimize heat loss. The lid 74 preferably is positioned in the housing 66 so that the lid 74 engages the walls 72 to form a generally air-tight seal when closed, as is known. Preferably, the barbecue grill 20 is mounted in the housing 66 at a position vertically spaced apart from the floor portion 67. Grease and other liquids released from the object 21 as the object is barbecued pass through the barbecue grill 20 and collect on the floor portion 67. As is known, the floor portion 67 is formed to direct liquids accumulated thereon to a drain (not shown in FIG. 2B) through which the liquids exit the housing 66.

As can also be seen in FIG. 2B, the housing 66 preferably includes one or more insulating components 75 which are included in the floor 67, the walls 72, and the lid 74. The insulating component 75 may be any suitable material or structure, as would be known by one skilled in the art. However, it is preferred that the insulating component be an air gap (not shown), i.e., an enclosed space defined by a double-walled construction in which "dead" air provides the insulating effect. As a double-walled structure is well known in the art, it is not necessary to provide any further description of this construction.

As can be seen in FIG. 2A, by positioning the resistive element subassembly 38 relatively close to the object 21 (i.e., relatively close to the plane "P"), the radiation view factor of the resistive element subassembly 38 with respect to the object 21 is very favorable. The preferred distance 43 is approximately 0.2 inches. Also, because of the positioning of the resistive element subassembly 38 relatively proximal to the object 21, much more thermal radiation is received by the object 21 than would be the case if the resistive element subassembly 38 were positioned further away from the object 21, as is the case in the prior art. It will be appreciated by those skilled in the art that the appropriate balance is required to be found between the amount of thermal radiation provided to the object 21 and the amount of heat transferred to the object 21 by conduction, i.e., at the contact between the object 21 and the top surfaces 27 of the ribs. Preferably, sufficient heat is transferred to the object 21 via conduction from the ribs 22 that charred (black) grill markings are developed on the object within a predetermined time period. Also, it is preferred that, within approximately the same time period, sufficient heat is transferred to the object 21 via thermal radiation to cook the object to a desired extent.

Figure 10:
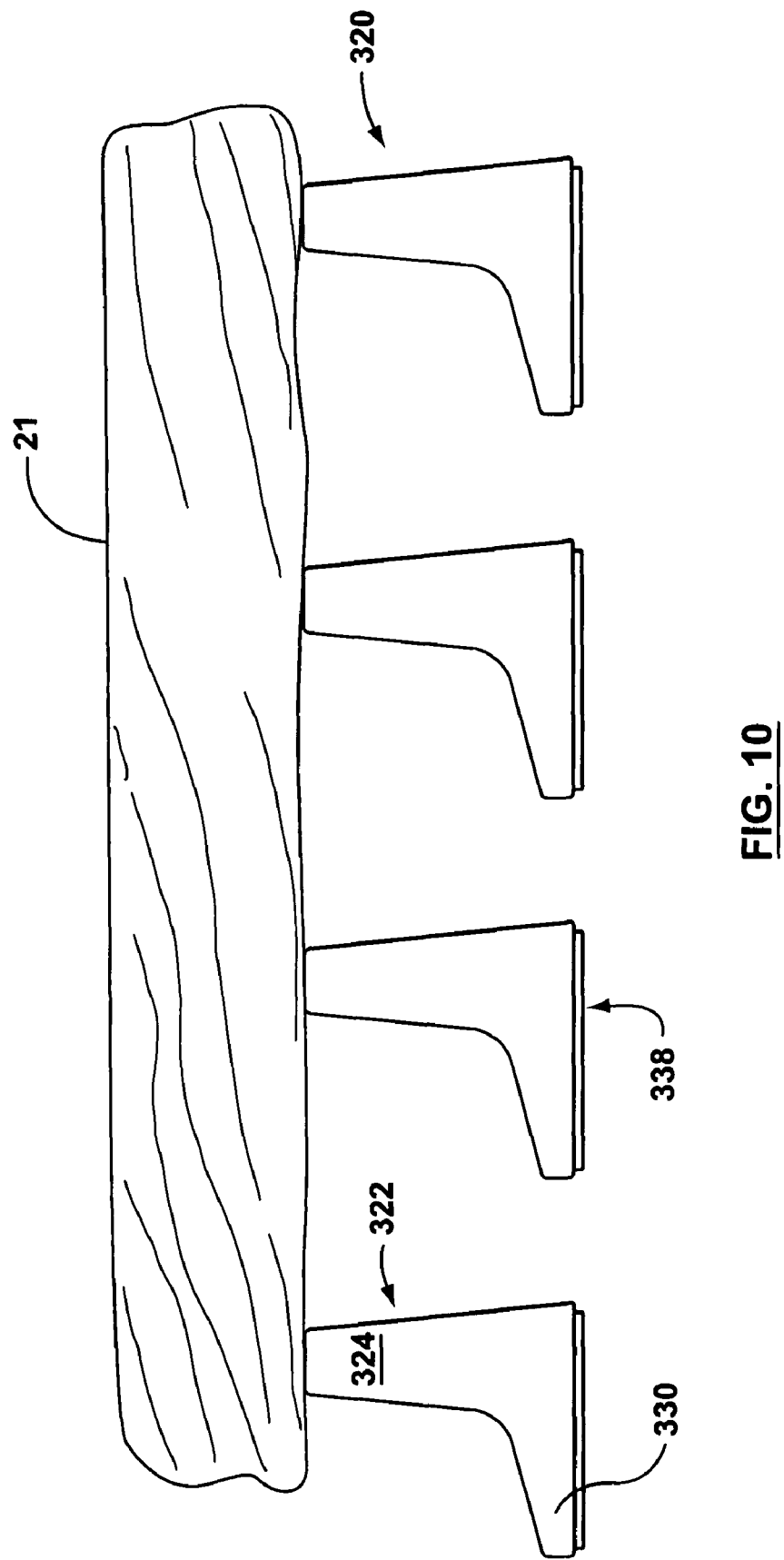
FIG. 10 is a cross-section of a portion of an alternative embodiment of the barbecue grill of the invention, drawn at a larger scale.

It will be understood that, although the ribs 22 as illustrated are generally in the shape of an inverted "T", the ribs 22 may have any suitable configuration or form. For example, FIG. 10 illustrates ribs having an alternate structure, as will be described.

Additional embodiments of the invention are shown in FIGS. 3A-26. In FIGS. 3A-26, elements are numbered so as to correspond to like elements shown in FIGS. 1, 2A, and 2B.

Another embodiment of the barbecue grill 120 of the invention is shown in FIGS. 3A, 3B, 4A, and 4B. The barbecue grill 120 includes a number of ribs 122 for supporting the object 21 spaced apart from each other by at least a first predetermined distance 123. The barbecue grill 120 also includes one or more resistive element subassemblies 138 positioned at least partially under the ribs 122, as will be described. Preferably, the grill 120 includes one resistive element subassembly 138. As will be described, the resistive element subassembly 138 is for generating heat to barbecue the object 21. Each rib 122 includes a contact surface 188 with which the resistive element subassembly 138 engages, for conduction of heat generated by the resistive element subassembly 138 into each rib 122.

It is preferred that the resistive element subassembly 138 includes a resistive element 140 positioned inside a sheath 180. An electric insulator 182 is positioned between the resistive element 140 and the sheath 180, to prevent electric current from passing directly from the resistive element 140 to the sheath 180, as is known.

Figure 3A:
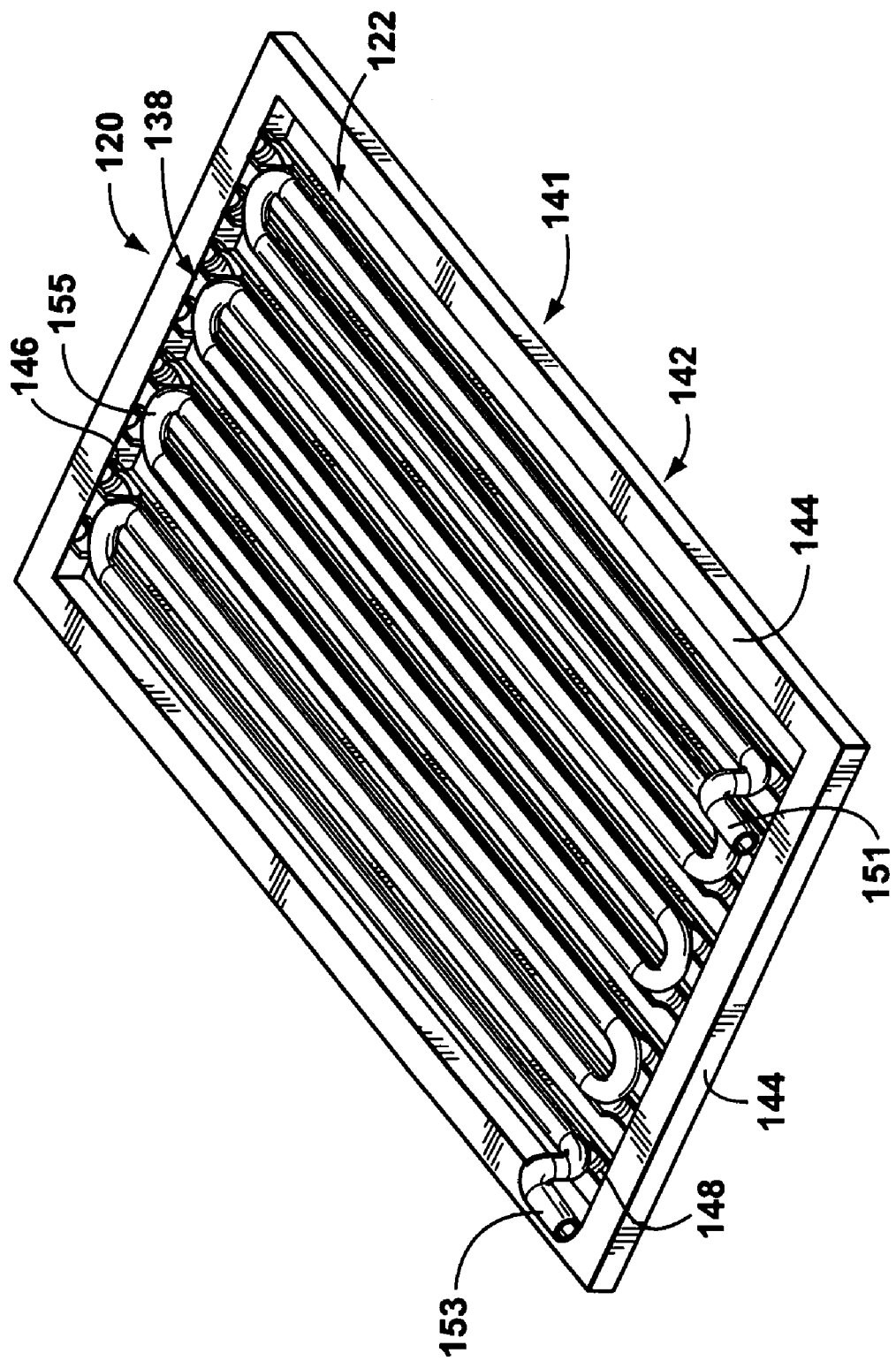
FIG. 3A is an isometric view of a lower side of an alternative embodiment of a barbecue grill of the invention, drawn at a smaller scale.
Figure 4A:
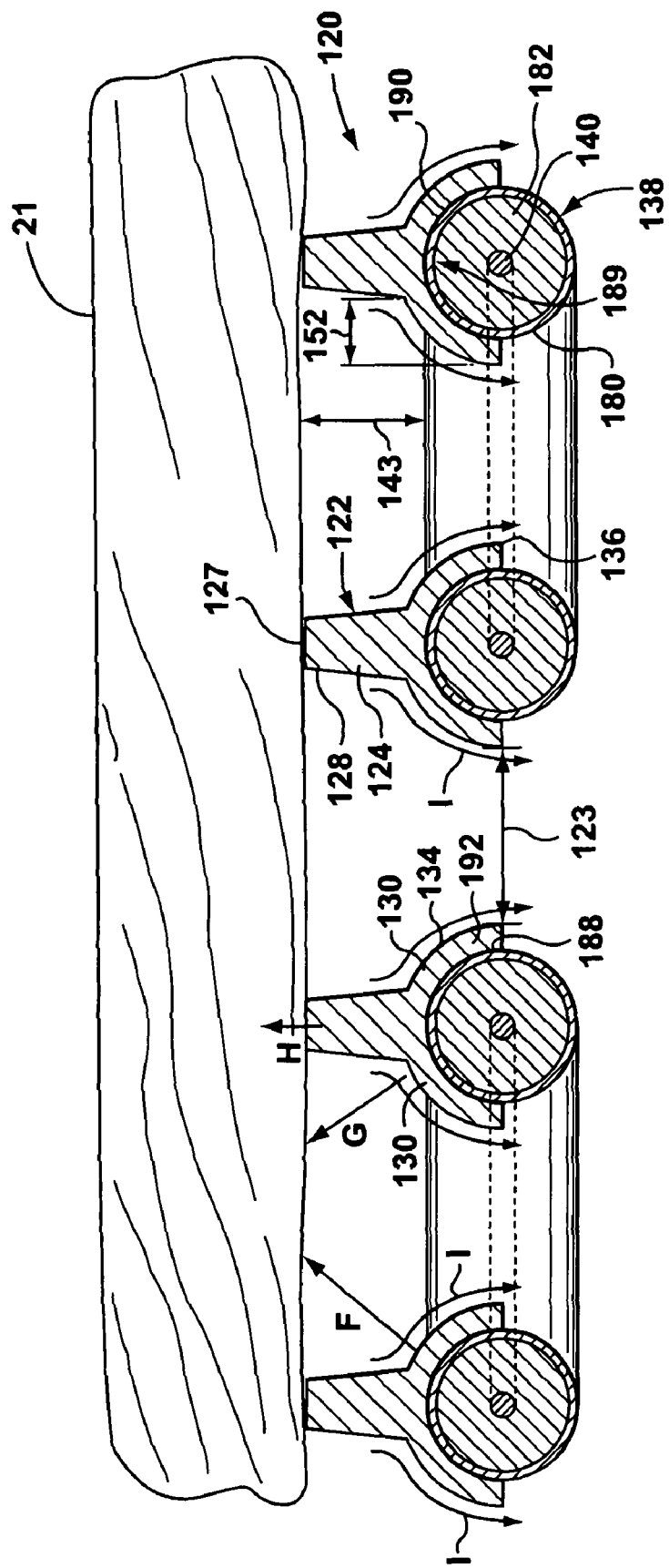
FIG. 4A is a cross-section of a portion of the barbecue grill of FIG. 3A, drawn at a larger scale.

Preferably, the sheath 180 includes a mating portion 189 with an outer surface 190 shaped for engagement with the contact surface 188. It is preferred that the outer surface 190 engages the contact surface 188 generally, for conduction of heat generated by the resistive element 140 from the sheath 180 to the contact surface 188. FIG. 3A shows ribs 122 with the resistive element subassembly 138 positioned on the contact surface 188, but it also shows contact surfaces 188 in which the resistive element subassembly is not positioned. As shown in FIGS. 3A and 4A, the contact surface 188 preferably substantially defines a semi-circle (or defines an arc describing a part of a circle, as the case may be), and the outer surface 190 is also substantially semi-circular (or defines an arc describing a part of a circle, as the case may be), and formed to fit with the contact surface 188.

As can be seen in FIG. 4A, each rib 122 includes a central portion 124 extending from the contact surface 188 to a top surface 127 at a top end 128 thereof. Each rib 122 also includes ridge portions 130 extending generally transversely from the central portion 124. As can be seen in FIG. 4A, each ridge portion 130 includes an upper surface 134 which generally faces upwardly and toward an adjacent rib.

In order to facilitate more efficient heat transfer from the contact surface 188 to the upper surface 134, body segments 192 of the ridge portions 130 preferably are as thin as practicable. The body segments 192 should be sufficiently thick to provide for durable ridge portions 130, i.e., ridge portions which are sufficiently substantial to withstand cleaning after use of the barbecue grill 120. However, the thinner the ridge portion 130, the more efficiently heat may be transferred via the ridge portion 130, i.e., from the contact surface to the upper surfaces. Accordingly, each upper surface 134 is preferably positioned proximal to the contact surface 188 in each rib 122.

From the foregoing, it can be seen that heat is both conducted to the top surface 127 from the resistive element subassembly 138, and heat is also radiated generally upwardly from the upper surfaces 134.

Figure 3B:
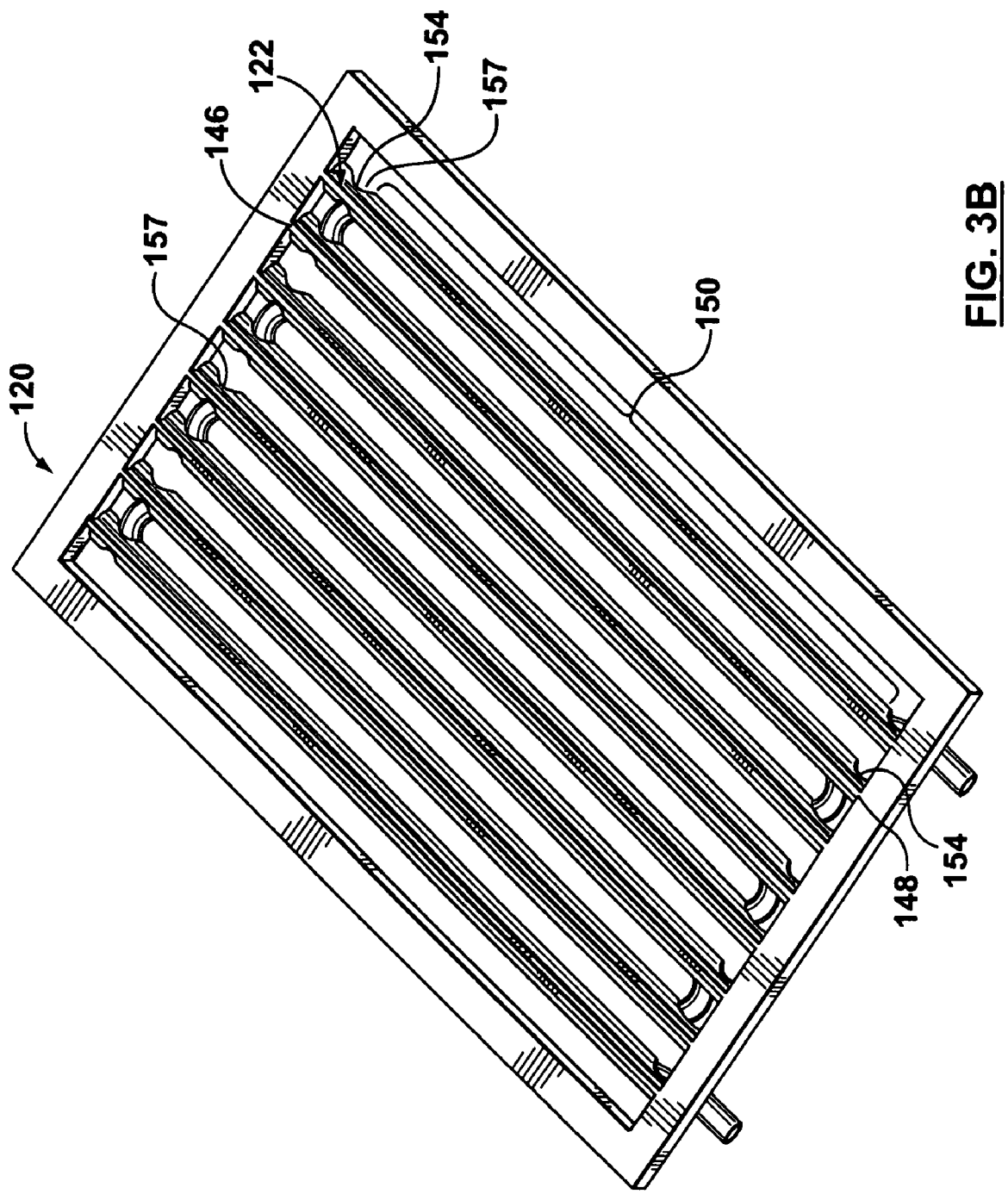
FIG. 3B is an isometric view of an upper side of the barbecue grill of FIG. 3A.

As can be seen in FIGS. 3A and 3B, the barbecue grill 120 includes a grid portion 141 thereof having a frame 142 with one or more support members 144. The grid portion 141 also includes the ribs 122. Each rib 122 extends between a first end 146 and a second end 148 thereof, both of which are attached to the support member 144. Preferably, the ribs 122 are positioned substantially parallel to each other.

As can also be seen in FIGS. 3A and 3B, each rib 122 is adapted for receiving the object 21 on the top end 128 of the central portion 124, and for heating the object 21 by both conduction of heat from the central portion 124 and radiation of heat from the upper surface 134 of the ridge portion 130. Preferably, the upper surface 134 is configured to direct the liquid released by the barbecued object toward an outer edge 136 thereof, as shown in FIG. 4A. The outer edge 136 is disposed distal to the central portion 124.

As can be seen in FIG. 4A, the resistive element subassembly 138 is preferably positioned a predetermined distance 143 below the object. A larger (e.g., taller) central portion 124 of each rib 122 tends to decrease the amount of heat available at the top end 128 for transfer to the object 21, i.e., to cook the object 21. Also, the extent of radiated heat to which the object 21 is subjected is substantially reduced where the distance 143 is larger. The predetermined distance 143 should be large enough that the object 21 is not generally burned, but small enough that the object 21 receives sufficient heat to cook it.

As can be seen in FIGS. 3B and 4A, the ridge portions 130 extend laterally from the central portion 124. Preferably, each rib 122 is formed as an integral body which includes the central portion 124 and the ridge portions 130, integrally joined together.

In one embodiment, the outer edge 136 of each ridge portion 130 is spaced apart from each rib 122 which is adjacent thereto by the predetermined distance 123 to permit drainage of the liquid from each upper surface 134 at the outer edge 136 thereof (FIG. 4A). The distance 123 between adjacent ribs 122 should be minimized, in order to maximize the heat radiated onto the object 21. However, the distance between adjacent ribs 122 should also be sufficiently large to permit liquid and food particles to pass downwardly between adjacent ribs 122. It has been determined that the optimal distance between adjacent ribs 122 is approximately 0.2 inches.

As can be seen in FIG. 3B, the central portion 124 of each rib 122 includes a main segment 150 extending between the first and second ends 146, 148, and spaced apart from the first and second ends 146, 148. The ridge portions 130 of each rib 122 preferably extend laterally a preselected distance 152 from the central portion along the length of the main segment 150. It is also preferred that each rib 122 includes one or more notches 154 defining an opening 157 (FIG. 3B) for permitting movement of liquid and food particles from the object therethrough by gravity.

Figure 4B:
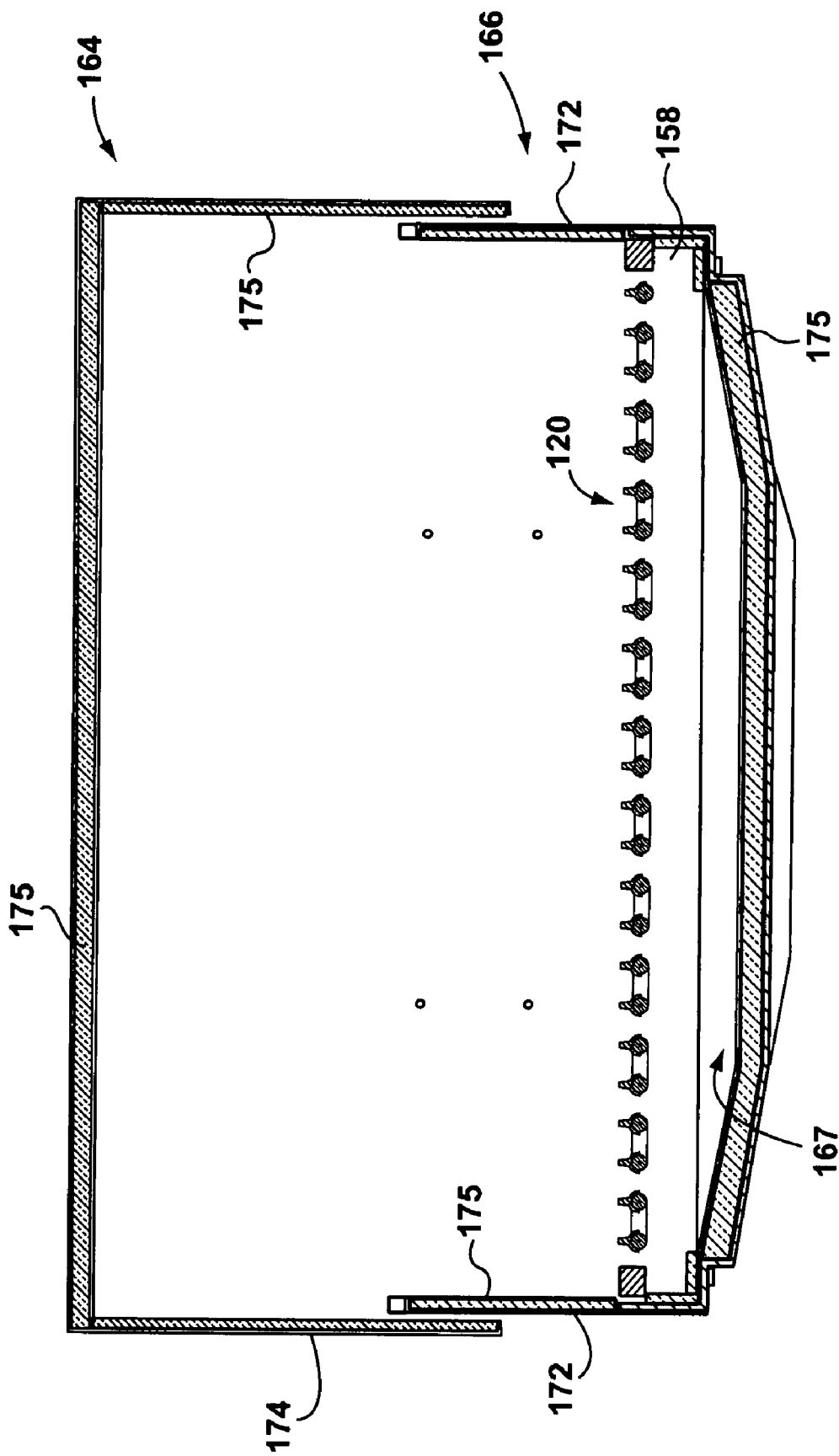
FIG. 4B is a cross-section of another embodiment of a barbecue assembly of the invention including the barbecue grill of FIG. 4A, drawn at a smaller scale.

The notches 154 are sized and located so that the opening 157 defined thereby permits liquids and waste materials (i.e., food particles) from the object which are scraped off or otherwise directed by the rib (e.g., when the ribs are cleaned, after use) to fall into a space 158 provided beneath the barbecue grill 120 (FIG. 4B).

As described above, it will be understood that most of the liquid and food particles from the object falls between the ribs. The opening 157 is useful primarily in connection with disposal of the food particles scraped from the ribs during cleaning thereof.

Preferably, the resistive element subassembly 138 is continuous, extending from one end 151 thereof to another end 153 thereof. The ends 151, 153 are adapted for connection to a source of electrical power to the resistive element 140, as is known. The means for connecting the ends 151, 153 to the electrical power source are not illustrated, as they are well known in the art. The resistive element subassembly 138 also preferably includes a plurality of corner portions 155 (FIG. 3A).

As can be seen in FIGS. 3A and 3B, the notches 154 preferably are positioned to accommodate the corner portions 155 of the resistive element subassembly 138. At those locations where the corner portion 155 extends between ribs, the resistive element subassembly 138 occupies the openings defined by the notches 154. Accordingly, in the grill 120, the notches 154 are generally located a relatively small distance inwardly from the first and second ends 146, 148.

Preferably, the material out of which the grid portion 141 is made has a high heat tolerance, i.e., such material should be capable of withstanding temperatures of approximately 600° C. It is also preferred that the material of which the grid portion 141 is made has a reasonable ability to absorb heat through conduction and convection, as will be described. Because of the need to scrape the grid portion 141 after use, it is also preferred that the grid portion 141 be made of material having sufficient durability to withstand repeated cleanings with metallic tools. Finally, the material should be a material to which a porcelain coating would adhere. The grid portion 141 may be made of any suitable material, e.g., cast iron, steel, or stainless steel. Also, those skilled in the art would appreciate that certain grades of aluminum which are relatively hard (e.g., aluminum grade 6061-T6) may be suitable.

In use, the resistive element 140 generates heat when an electrical current passes through the resistive element 140. Heat is conducted from the resistive element 140 through the electrical insulator 182 to cause the sheath 180 to become hot. As described above, heat is conducted from the mating portion 189 through the outer surface 190 thereof to the contact surface 188 of each rib 122. As schematically illustrated by arrows "F" and "G" in FIG. 4A, heat is radiated from the upper surfaces 134 of the ridge portions 130 to cook the object 21. Also, heat is conducted through the central portion 124 to the top surface 127 (as illustrated by arrow "H" in FIG. 4A), to be conducted to the object 21 (i.e., where the object 21 is in contact with the top surface 127), and to provide charred (black) grill markings on the object 21.

As a practical matter, it is unlikely that a "perfect" (or substantially perfect) mate between the outer surface 190 of the mating portion 189 of each sheath 180 and the contact surface 188 of each rib 122 is achieved. Instead, it is anticipated that there will occasionally be very small gaps (not shown) present (i.e., in barbecue grills constructed in accordance with this embodiment of the present invention) between the outer surface 190 of the mating portion 189 of the sheath 180 and the contact surface 188 of the rib 122. It will be understood that, although the resultant gaps between the outer surface 190 and the contact surface 188 would typically be relatively small, the contact surface 188 (and, as a result, the central portion 124) are, to an extent, heated by convection from the outer surface 190 where such gaps exist, as well as by conduction where there is direct contact. Accordingly, in practice, heat is transferred to the rib 122 via conduction and convection.

As can be seen in FIG. 4A, grease and other liquids released by the object 21 as it is barbecued move downwardly past the ribs 122, under the influence of gravity. The flow of such liquids due to gravity is schematically illustrated by arrows "I" in FIG. 4A.

As shown in FIG. 4B, the barbecue grill 120 preferably is included in a barbecue assembly 164 which includes a housing 166 with a floor portion 167. The housing 166 also includes walls 172 extending upwardly from the floor portion 167 and an openable lid 174 which preferably are insulated, to minimize heat loss. The lid 174 preferably is positioned on the walls 172 a distance above the floor portion 167, as is known. Preferably, the barbecue grill 120 is mounted in the housing 166 at a position vertically spaced apart from the floor portion 167. Grease and other liquids released from the object 21 as the object is barbecued pass through the barbecue grill 120 and are collected on the floor portion 167. As is known, the floor portion 167 is formed to direct liquids accumulated thereon to a drain (not shown in FIG. 4B) through which the liquids exit the housing 166.

As can be seen in FIG. 4B, the housing 166 preferably includes one or more insulating components 175 included in the floor 167, the walls 172, and the lid 174. The insulating component 175 may be any suitable material or structure, as would be known by one skilled in the art. However, it is preferred that the insulating component be an air gap (not shown), i.e., an enclosed space defined by a double-walled construction in which "dead" air provides the insulating effect.

It will be appreciated by those skilled in the art that, where the sheath portion (e.g., sheath 180) of the resistive element subassembly (i.e., the sheathed element) is substantially circular in cross-section, manufacturing costs therefore are somewhat lower than those incurred in manufacturing a sheathed element in which the cross-section of the sheath is not substantially circular (e.g., the sheath 80 in the resistive element subassembly 38).

Figure 5:
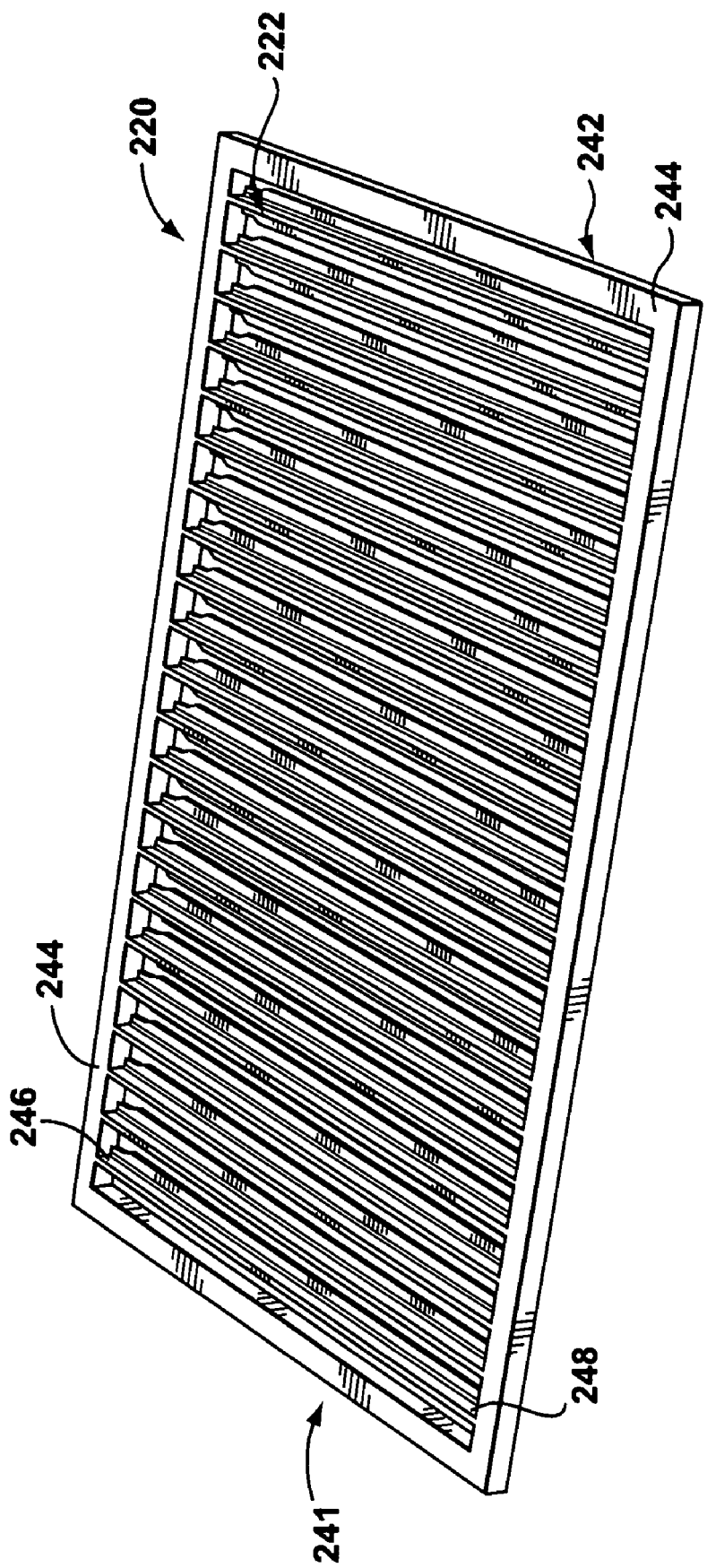
FIG. 5 is an isometric view of an upper side of an alternative embodiment of a barbecue grill of the invention, drawn at a smaller scale.
Figure 6:
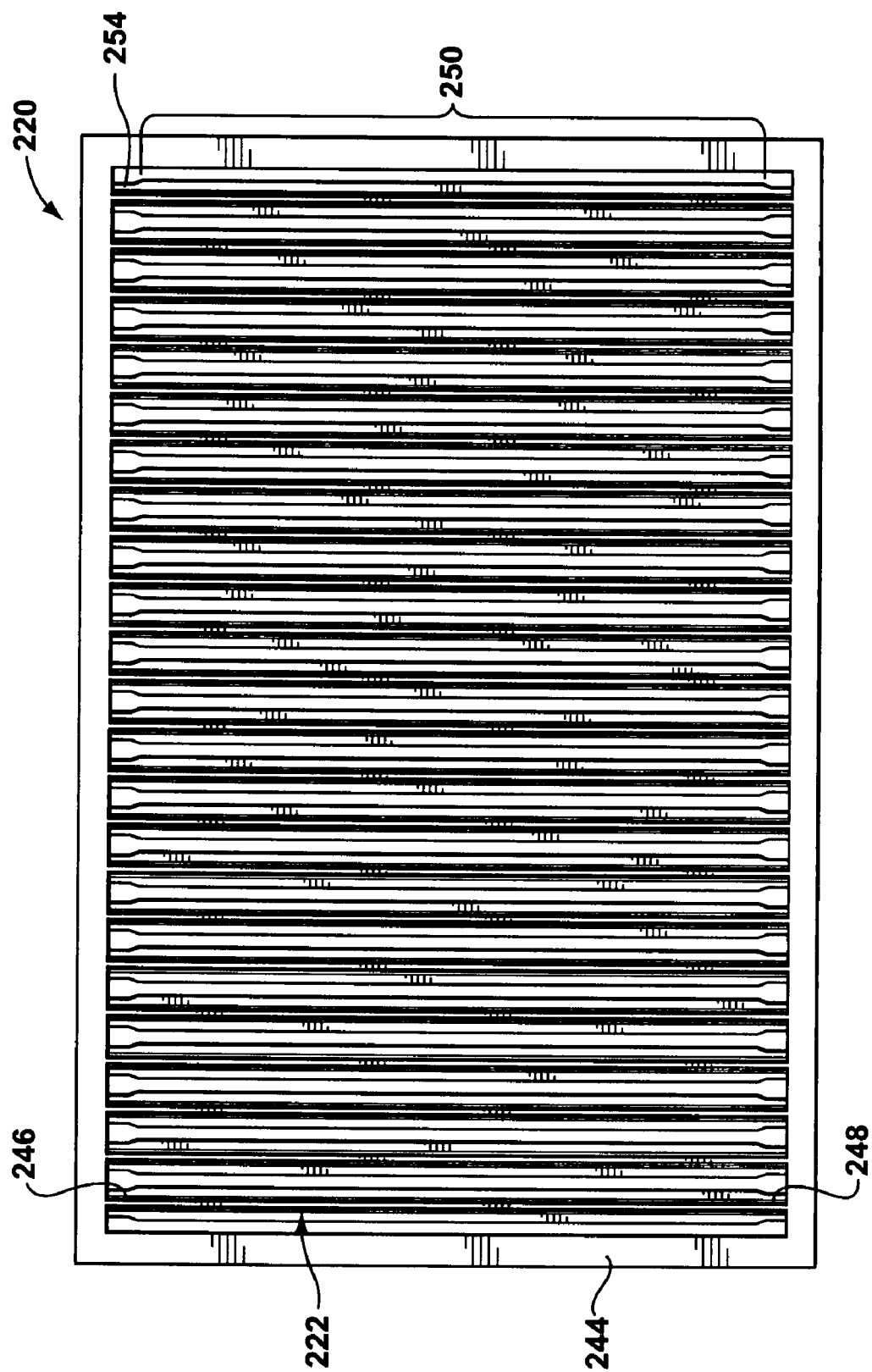
FIG. 6 is a top view of the barbecue grill of FIG. 5, drawn at a larger scale.
Figure 7:
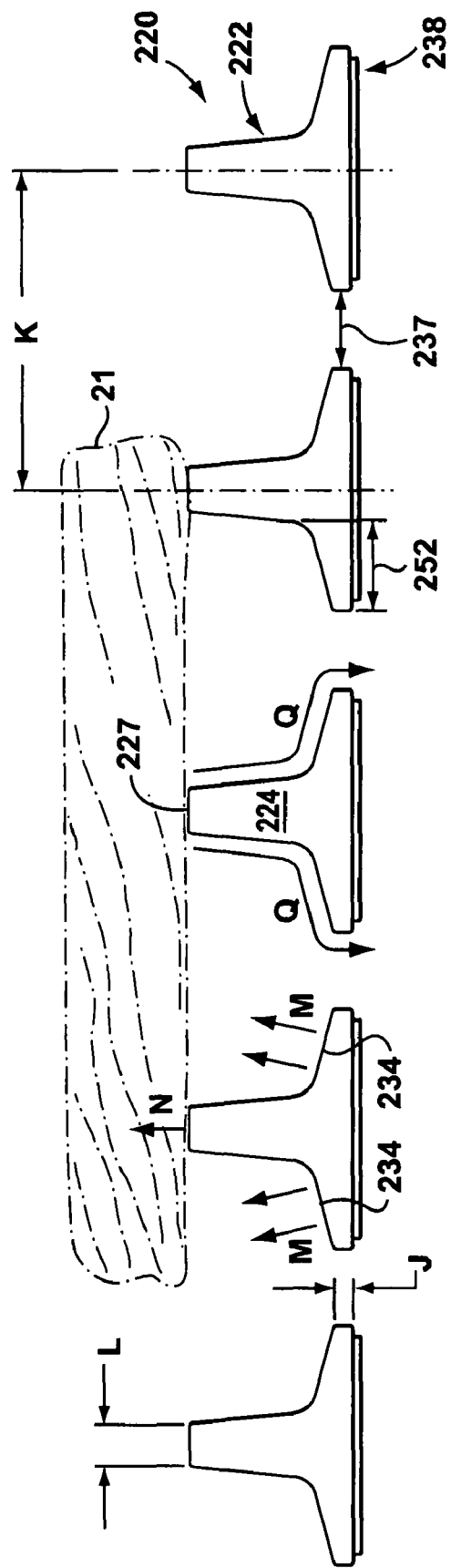
FIG. 7 is a cross-section of a portion of the grill of FIG. 6, drawn at a larger scale.
Figure 8:
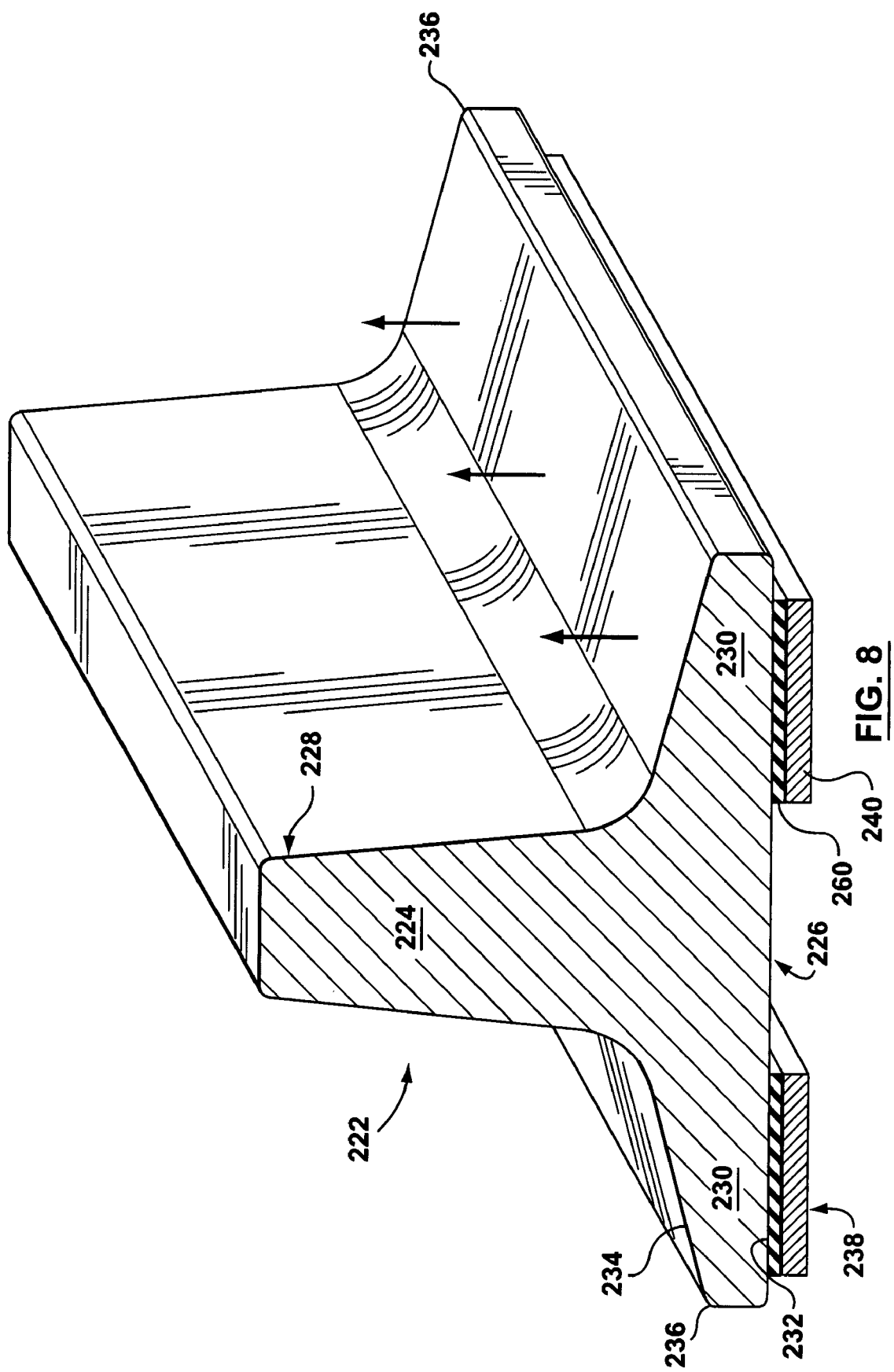
FIG. 8 is an isometric view (partially cut away) of a rib in the barbecue grill of FIG. 6, drawn at a larger scale.

Reference is next made to FIGS. 5-9 to describe another embodiment of a barbecue grill in accordance with the invention indicated generally by the numeral 220. As can be seen in FIGS. 5-7, the barbecue grill 220 includes a number of elongate ribs 222 for supporting the object 21. Each rib 222 includes an elongate central portion 224 extending substantially vertically between a bottom end 226 and a top end 228 (FIG. 8). Preferably, the rib 222 includes one or more ridge portions 230 positioned generally transverse to the central portion 224 and below the top end 228. The ridge portion 230 includes a lower surface 232 adjacent to the bottom end 226 and an upper surface 234 positioned above the lower surface 232. Preferably, the upper surface 234 extends between the central portion 224 and an outer edge 236 of the ridge portion 230 which is positioned distal to the central portion 224 (FIG. 8).

The rib 222 preferably also includes a resistive element subassembly 238 (FIGS. 8 and 9) having a resistive element 240 for generating heat upon electric current passing therethrough. It is also preferred that the resistive element 240 is adapted for connection to an electrical power source (not shown), as is known in the art. The resistive element subassembly 238 preferably is secured to the bottom end 226, the lower surface 232, or combinations thereof. Each rib 222 is adapted for receiving the object 21 on the top end 228 of the central portion 224, and for heating the object to be barbecued by conduction of heat from the central portion and by radiation of heat from the upper surface 234 of the ridge portion 230, as will be described. Preferably, the upper surface 234 of the ridge portion 230 is configured to direct the liquid released by the barbecued object toward the outer edge 236, as will also be described.

As can be seen in FIG. 7, the ridge portion 230 extends laterally from the central portion 224. It is also preferred that each rib 222 is formed as an integral body which includes the central portion 224 and the ridge portion 230, integrally joined together.

In one embodiment, the outer edge 236 of each ridge portion 230 is spaced apart from each rib 222 which is adjacent thereto by a predetermined distance 237 to permit drainage of the liquid from each upper surface 234 at the outer edge 236 thereof (FIG. 7). The distance 237 should be minimized, in order to maximize the heat radiated onto the object being barbecued. However, this distance should also be sufficiently large to permit liquid and food particles to pass downwardly between the ribs 222. It has been determined that the optimal distance 237 is approximately 0.2 inches.

As can be seen in FIGS. 5 and 6, the barbecue grill 220 preferably includes a grid portion 241 having a frame 242 with one or more support members 244. Each rib 222 extends between a first end 246 and a second end 248 thereof. Preferably, the first end 246 and the second end 248 are both attached to the support member 244 (FIG. 6). It is also preferred that the ribs 222 are positioned substantially parallel to each other (FIG. 5).

As shown in FIG. 6, the central portion 224 of each rib 222 includes a main segment 250 extending between the first and second ends 246, 248, and spaced apart from the first and second ends 246, 248. The ridge portion 230 of each rib 222 preferably extends laterally a preselected distance 252 (FIG. 7) from the central portion 224 along the length of the main segment 250. It is also preferred that each rib includes one or more notches 254 defining an opening 257 (FIG. 6).

Figure 13:
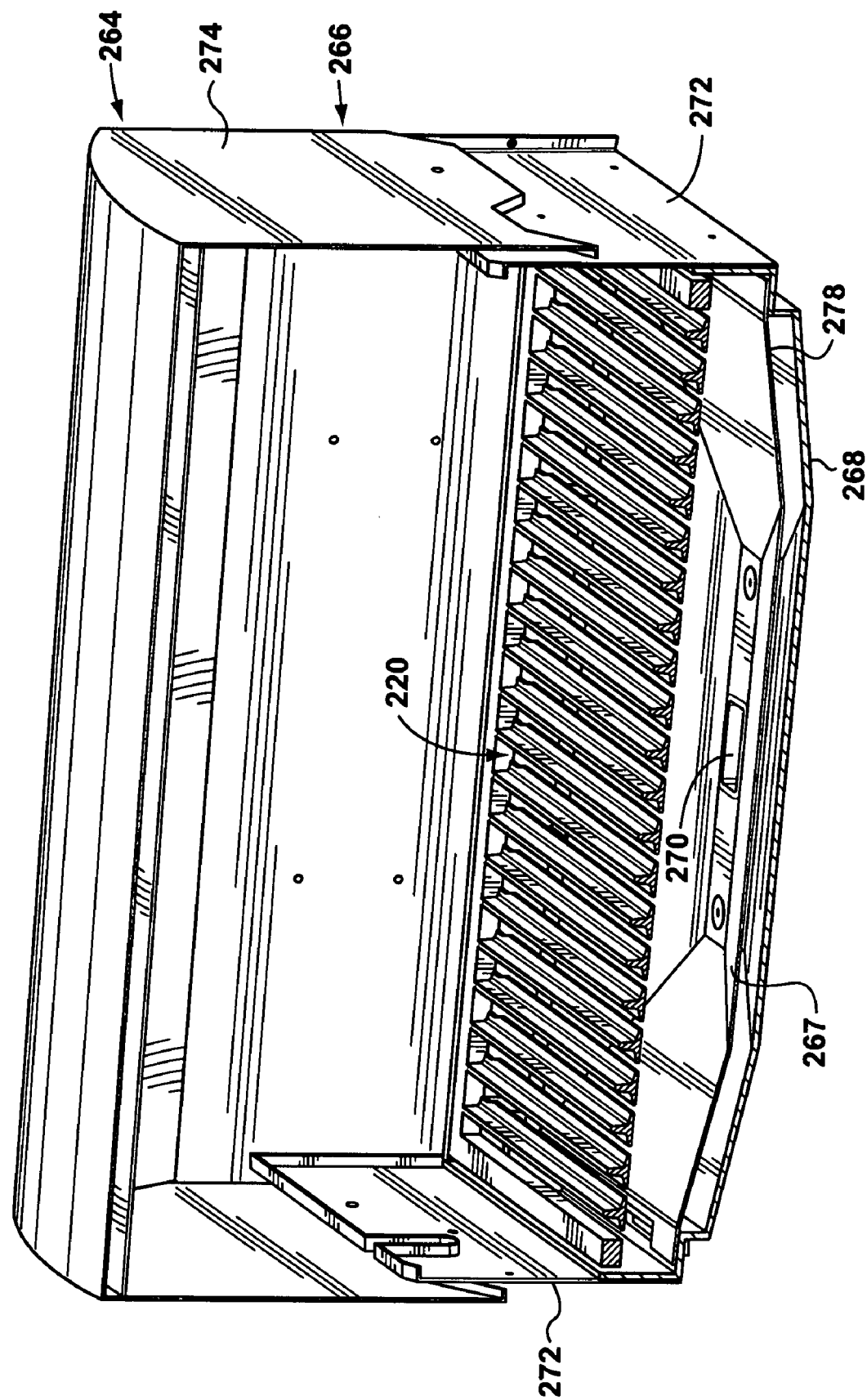
FIG. 13 is an isometric view (partially cut away) of an embodiment of a barbecue assembly of the invention.
Figure 14:
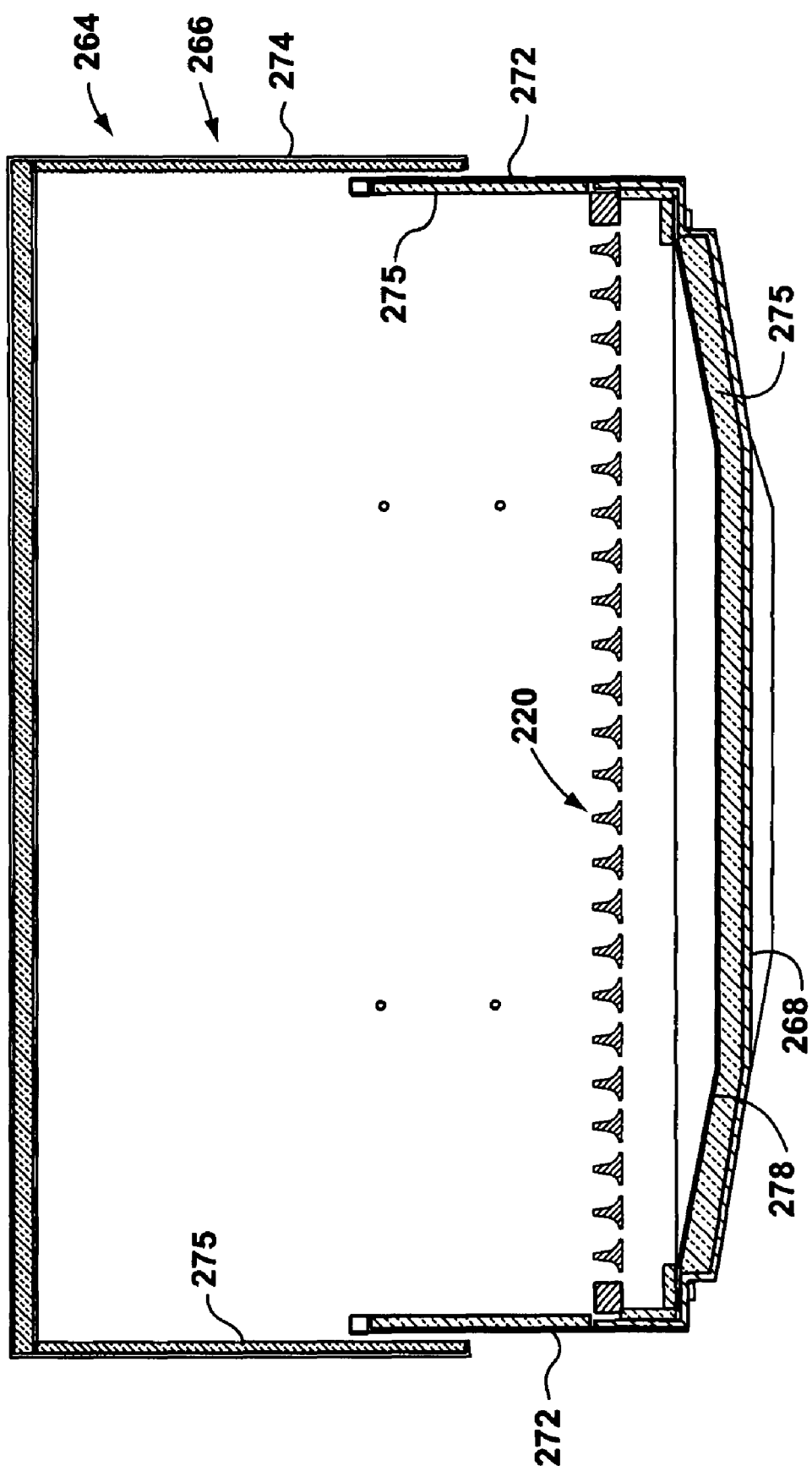
FIG. 14 is a cross-section of the barbecue grill assembly of FIG. 13.

The notch segments 254 are sized and located so that the opening 257 defined thereby permits liquids and waste materials (i.e., food particles) from the object which are scraped off or otherwise directed by the rib to fall into a space 258 provided beneath the barbecue grill 220 (FIGS. 13, 14).

Figure 9:
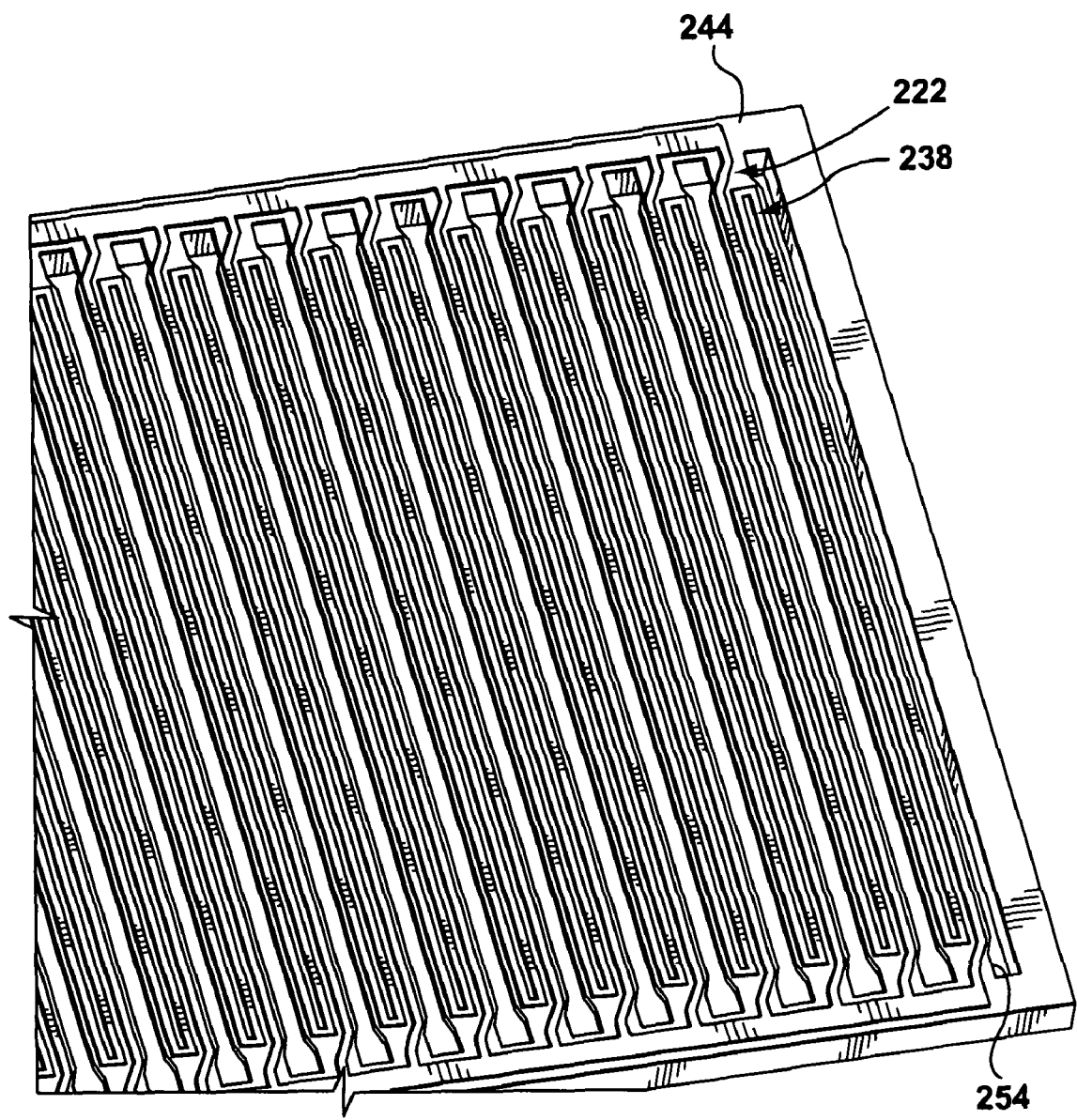
FIG. 9 is an isometric view of a lower side of the barbecue grill of FIG. 6, drawn at a smaller scale.

Preferably, the resistive element subassembly 238 includes a layer 260 of dielectric material for substantially electrically isolating the resistive element 240 from the ridge portion 230 and the central portion 224. As shown in FIG. 8, in one embodiment, the layer 260 is attached to the lower surfaces 232 of ridge portions 230. As can be seen in FIG. 9, the resistive element subassembly 238 may also be attached to the bottom end 226 of the central portion 224 as well as the lower surfaces 232 of the ridge portions 230. It will be appreciated by those skilled in the art that the resistive element subassembly 238 could also be attached only to the bottom end 226 of the central portion 224. Preferably, the resistive element subassembly 238 is continuous, extending from one end of the grid portion 241 to another (FIG. 9).

As can be seen in FIGS. 7 and 8, the upper surface 234 of the ridge portion 230 preferably is substantially planar. The upper surface 234 is also preferably positioned at a predetermined angle to the horizontal. Preferably, the predetermined angle is approximately 15°.

It will be appreciated by those skilled in the art that the ridge portion 230 preferably is formed to have a minimum thickness. For example, the minimum thickness of the ridge portion 230 is designated as "J" in FIG. 7. It will be understood by those skilled in the art that the minimum thickness of the ridge portion 230 is subject to certain constraints. To promote heat transfer through the ridge portion 230 from the lower surface 232 to the upper surface 234 (i.e., so that the maximum amount of heat is radiated from the upper surface 234), the ridge portion 230 generally should be as thin as possible. On the other hand, however, the ridge portion 230 needs to have sufficient thickness to enable it to withstand the loads to which it is subjected, to maintain structural integrity. For instance, if the rib were made of cast iron, then the distance J may be at least 0.05 inches, at a minimum.

Preferably, the material out of which the grid portion 241 is made has a similar thermal expansion rate as the resistive element subassembly 238. It is also important that the layer 260 be capable of adhering generally to the material. The material also preferably has a high heat tolerance, to enable it to withstand temperatures upwards of 600° C. The material preferably also should have a relatively good ability to conduct heat therethrough. Also, because of the need to scrape the grid portion 241 after use (i.e., to clean it), it is preferred that the grid portion 241 be made of material having sufficient durability to withstand repeated cleanings with metallic tools. In addition, the material out of which the grid portion is made should preferably be capable of receiving a porcelain coating, i.e., so that the porcelain coating generally can adhere to the material. The grid portion 241 may be made of any suitable material, e.g., cast iron. Also, those skilled in the art would appreciate that certain grades of aluminium which are relatively hard (e.g., aluminum grade 6061-T6) may be suitable.

In one embodiment, the lower surface of the ridge portion 230 is positioned approximately 0.4 inches below the top end of the central portion thereof, and the ridge portion has a minimum thickness of approximately 0.05 inches.

The preferred distance between the centers of the ribs (designated as "K" in FIG. 7) may vary between approximately 0.5 inch and about one inch. More preferably, such distance is approximately 0.8 inch.

The width of the top end (designated as "L" in FIG. 7) is preferably kept to a minimum in order to minimize the mass of the central portion which is required to be heated. However, the top end is subjected to cleaning (usually scraping with metal bristles or a metal tool), and a certain amount of width is required for structural integrity. Accordingly, the width of the top end is preferably approximately 0.1 inch.

As can be seen in FIGS. 7 and 8, the sides of the central portion preferably are sloped, for ease of manufacturing. Preferably, the sides are at approximately 6° from the vertical.

As shown in FIG. 7, heat (represented by arrows "M") is radiated from the upper surface generally upwardly, to assist in barbecuing the object to be barbecued. At the same time, heat (represented by arrow "N") is conducted from the top end to the object to be barbecued. Liquid from the object flows under the influence of gravity, as represented by arrows "Q" in FIG. 7.

As can be seen in FIGS. 13 and 14, a barbecue assembly 264 includes the barbecue grill 220 and a housing 266. The housing 266 preferably includes a floor portion 267 with a drain 270 (FIG. 13) to permit drainage of the liquid and one or more walls 272 for supporting the barbecue grill 220 a predetermined height above the floor portion 267. Preferably, the housing 266 also includes a movable lid 274 adapted to cooperate with the walls 272 for retarding heat transfer out of the housing 266. Also, the floor portion 267 preferably includes a floor 268 and a liner 278 mounted on the floor 268 and configured for channeling the liquid toward the drain 270.

In one embodiment, one or more portions of the housing 266 includes one or more insulating components 275 for retarding heat transfer out of the housing. The insulating component 275 may be any suitable material or structure, as would be known by one skilled in the art. However, it is preferred that the insulating component be an air gap (not shown).

As can be seen in FIG. 14, the bottom of the grill 220 preferably is positioned relatively close to the liner 278. Preferably, the volume of space between the bottom of the barbecue grill 220 and the liner 278 is minimized, in order that the barbecue assembly 264 may have maximum efficiency, i.e., to minimize the extent of heat loss. Preferably, the liner is positioned not more than approximately three inches below the ribs.

An alternative embodiment of a barbecue grill 320 of the invention including ribs 322 is disclosed in FIG. 10. Each rib 322 includes a central portion 324 and a single ridge portion 330. Preferably, each rib 322 has a portion of a resistive element subassembly 338 mounted on a bottom surface thereof. As shown in FIG. 10, it is preferred that the ribs 322 in a barbecue grill 320 including the ribs 322 are all oriented in the same way, i.e., with the ridge portions 330 on the same side of each central portion 324 respectively.

Figure 11:
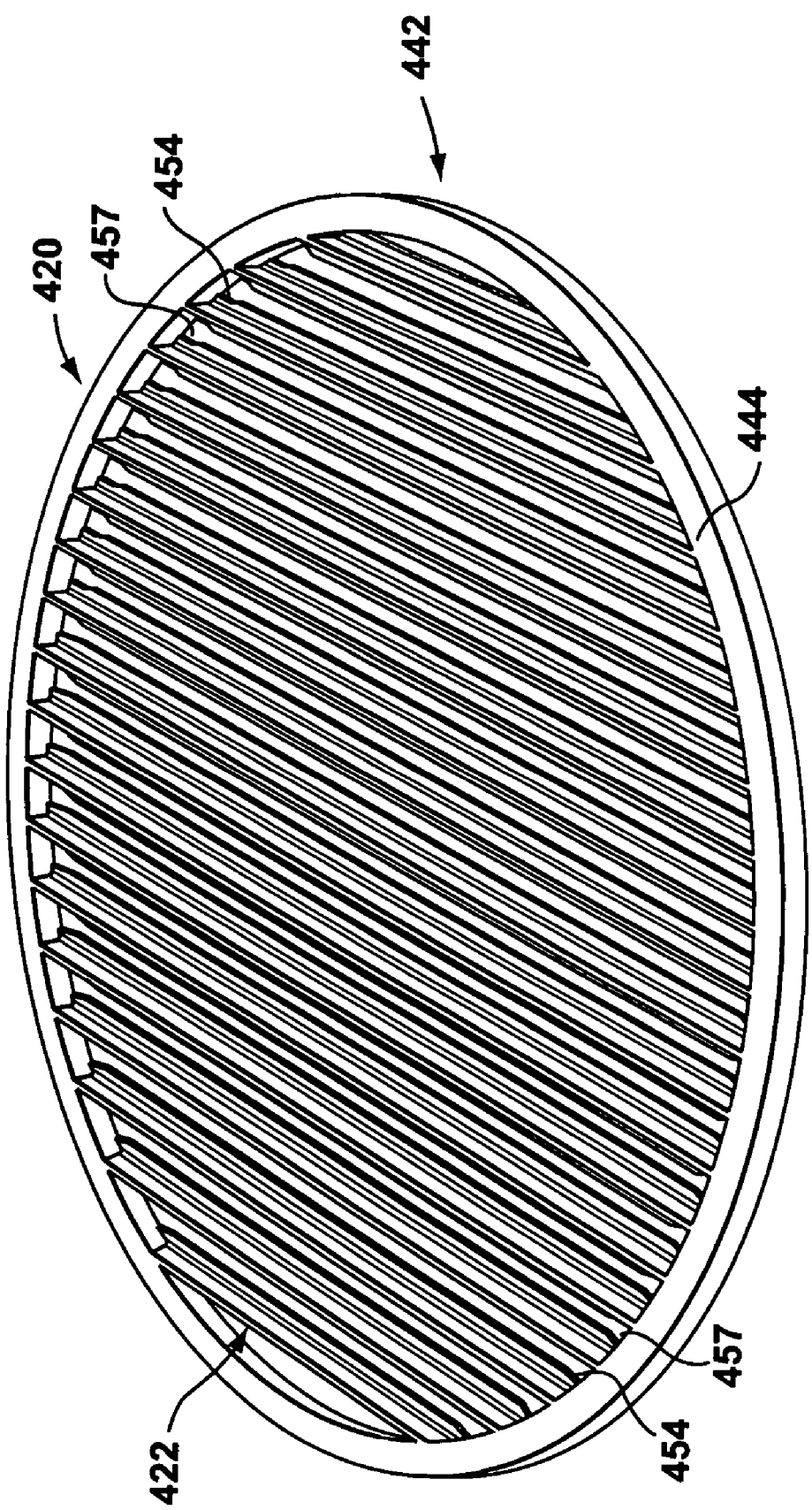
FIG. 11 is an isometric view of an alternative embodiment of the barbecue grill of the invention, drawn at a smaller scale.
Figure 12:
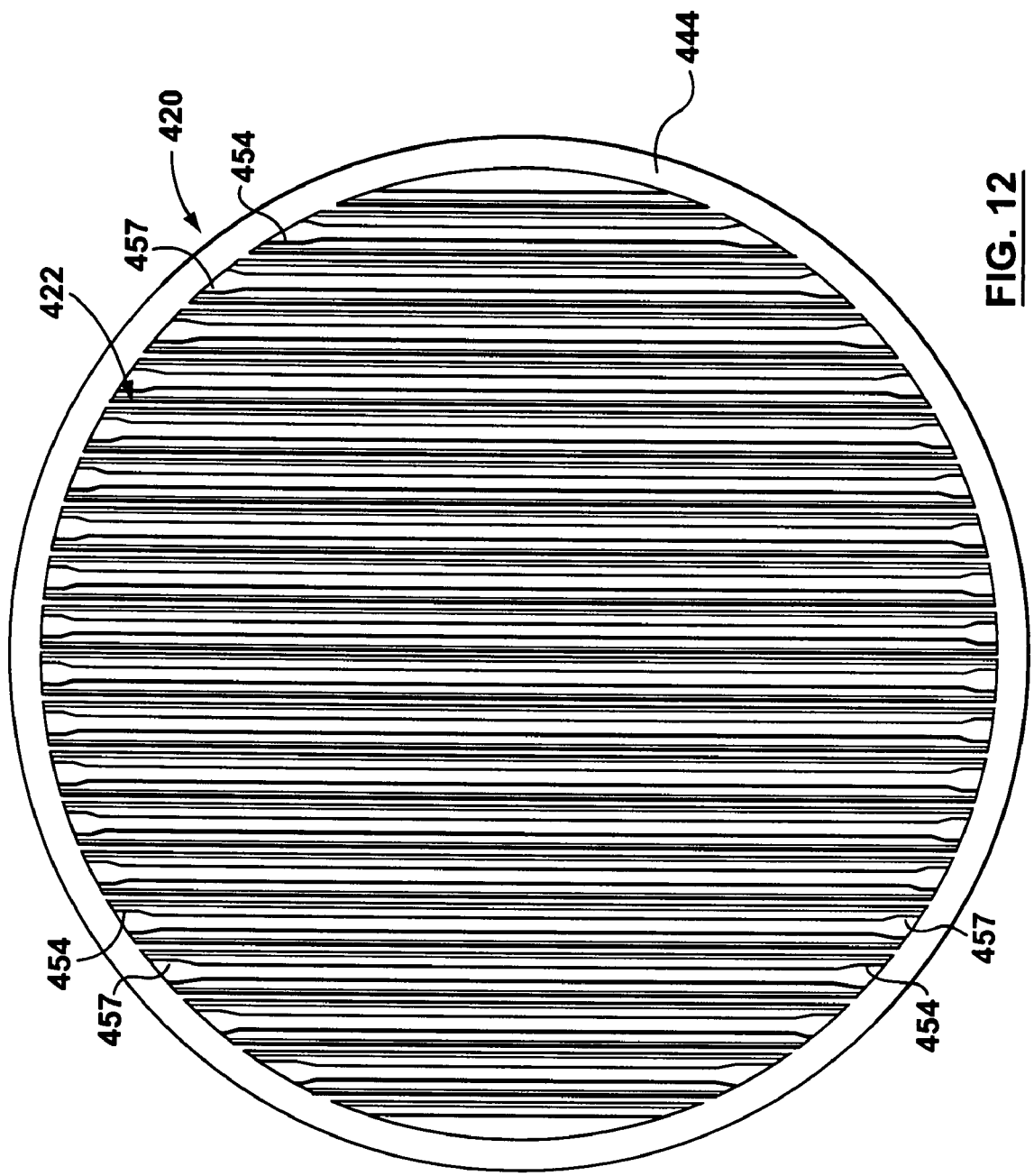
FIG. 12 is a top view of the barbecue grill of FIG. 11, drawn at a larger scale.

Another alternative embodiment of a barbecue grill 420 is shown in FIGS. 11 and 12. The barbecue grill 420 includes a frame 442 in which the support member 444 is generally circular in shape. Because of this, the ribs 422 in the barbecue grill 420 are of varying lengths. Preferably, a resistive element subassembly (not shown) similar to that shown in FIG. 8 is mounted on the bottom surfaces of the ribs 422.

As can be seen in FIGS. 11 and 12, the ribs 422 preferably include notches 454 defining openings 457 respectively, for permitting movement of liquid and food particles from the object (i.e., particularly food particles dislodged during cleaning of the grill 420) therethrough by gravity.

Figure 15:
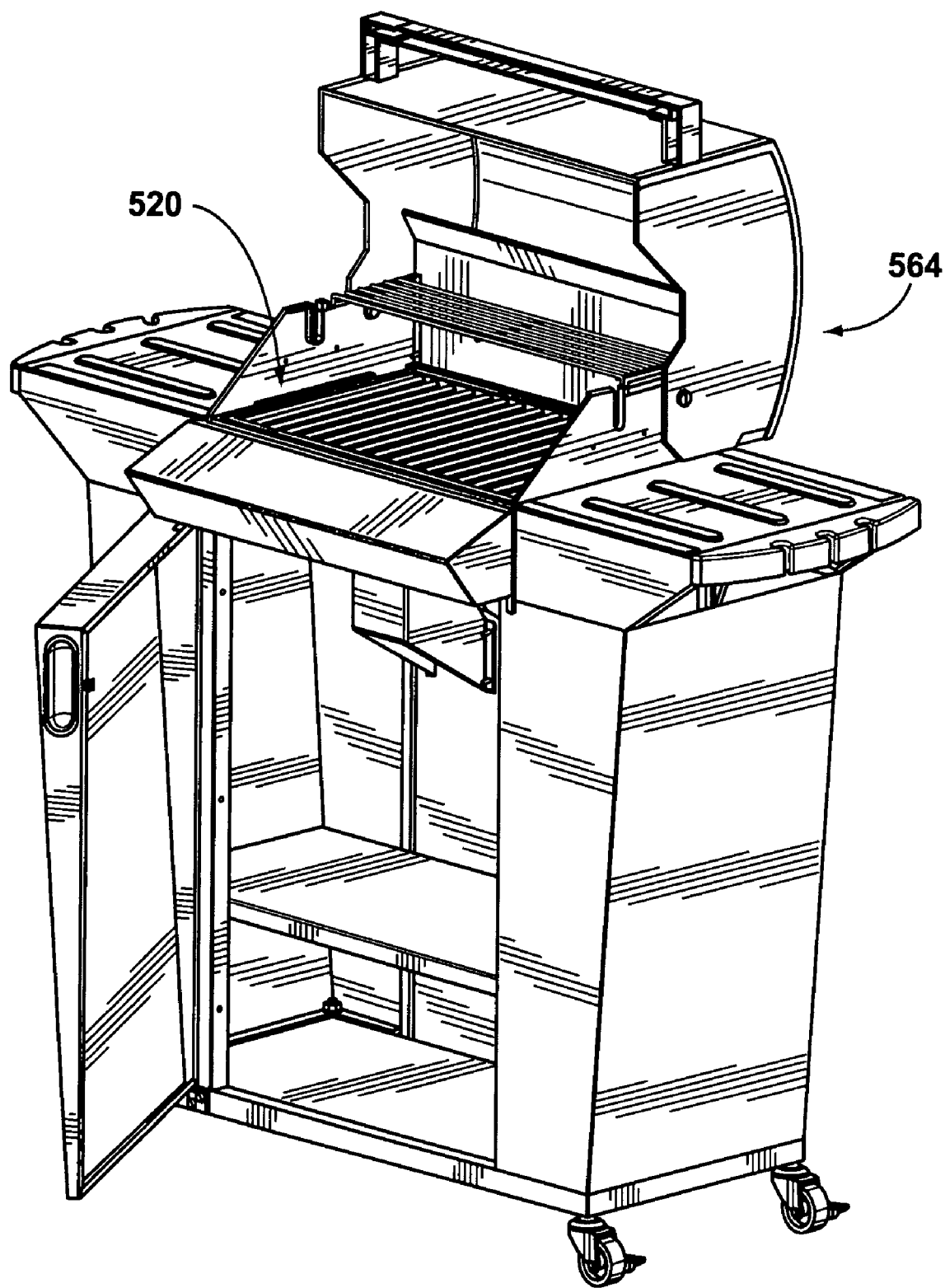
FIG. 15 is an isometric view of another alternative embodiment of the barbecue assembly of the invention in which an alternative embodiment of the barbecue grill of the invention is mounted in the grill position, drawn at a smaller scale.
Figure 16:
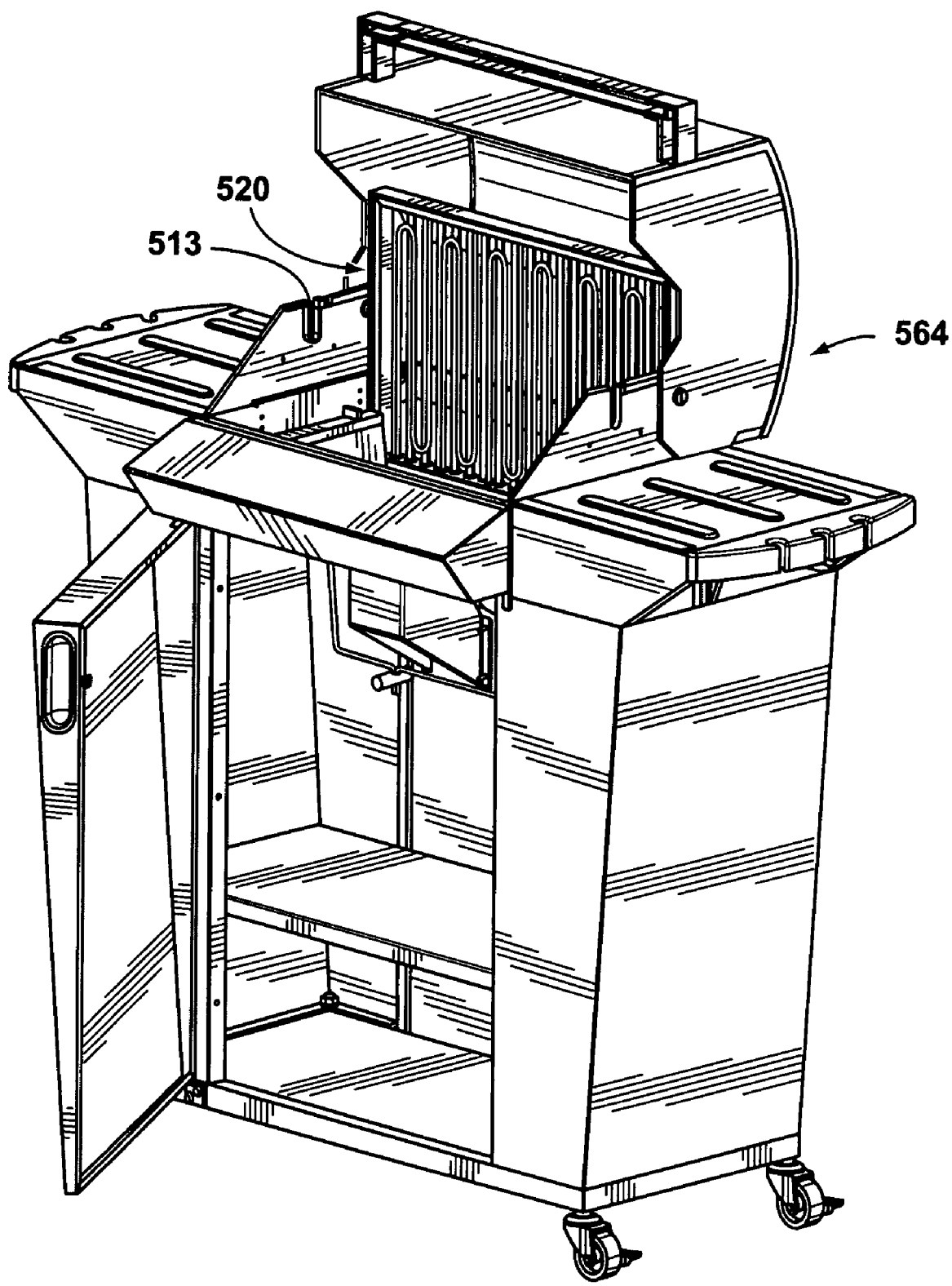
FIG. 16 is an isometric view of the barbecue assembly of FIG. 15 in which the barbecue grill is mounted in the broil position.

In another alternative embodiment shown in FIGS. 15-24, a barbecue grill 520 for cooking the object 21 preferably includes a first resistive element subassembly 531 and a second resistive element subassembly 533. Preferably, and as can be seen in FIGS. 15 and 16, the barbecue grill 520 is movable between one or more grill positions (FIG. 15), in which the grill is located for grilling the object 21, and one or more broil positions (FIG. 16), in which the grill is located for broiling the object 21. The grill 520 is energizable in the grill positions and in the broil positions, as will be described.

Figure 22:
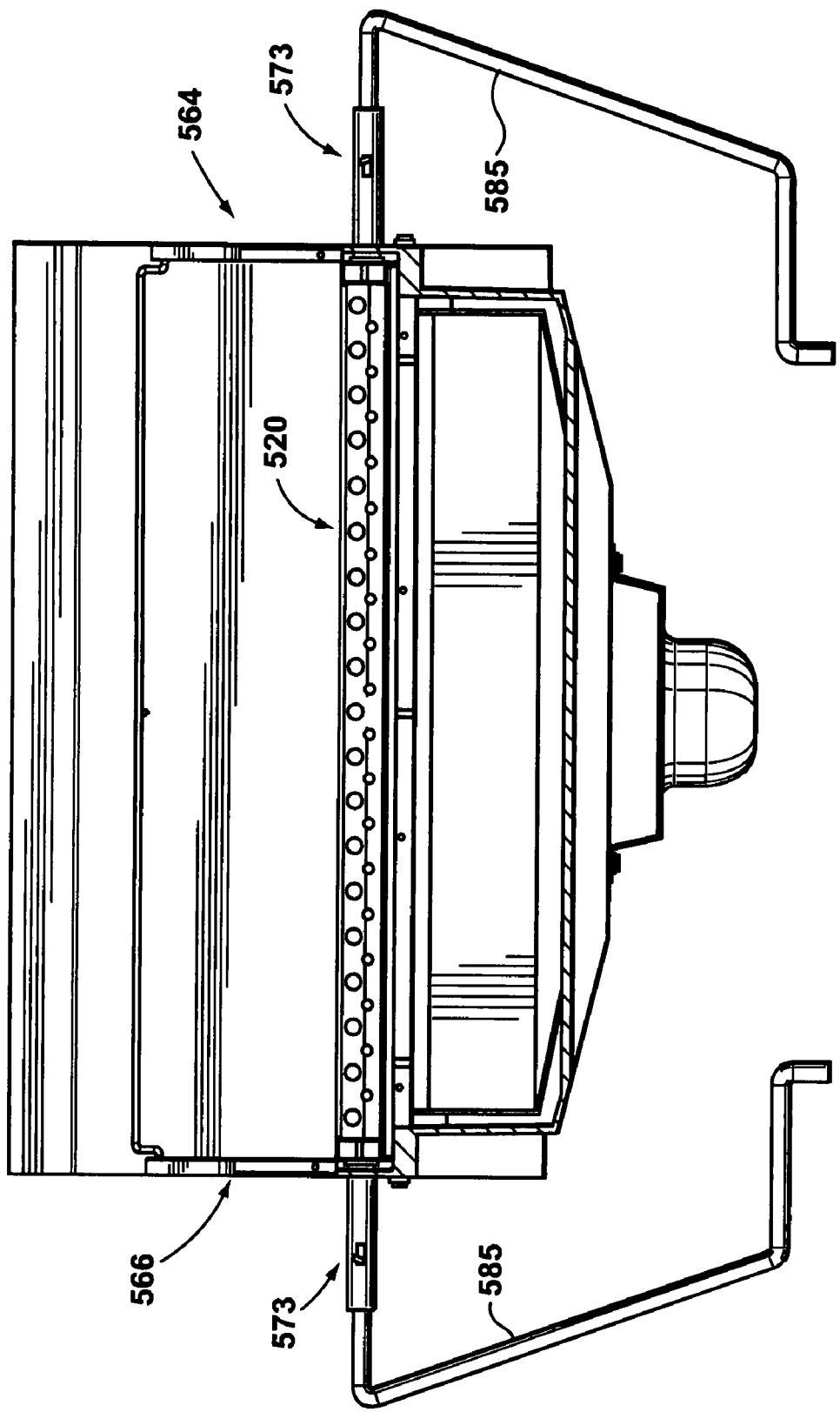
FIG. 22 is a cross-section of the barbecue assembly of FIG. 21.

Preferably, the grill 520 includes a frame 542 to which the first and second resistive element subassemblies 531, 533 are attached, so that the frame 542 supports the first and second resistive element subassemblies 531, 533. As can be seen in FIG. 22, when the grill 520 is in the grill position, the first resistive element subassembly 531 preferably defines a plane "P1" at which the object 21 is substantially supported. It is also preferred that the second resistive element subassembly 533 is spaced apart from the plane by a predetermined distance "D1" selected so that the second resistive element subassembly 533 is sufficiently proximal to the object 21 to at least partially cook the object 21. Preferably, the object 21 is receivable on at least part of the first resistive element subassembly 531 and supportable thereby.

Due to the positioning of the object 21 directly on the first resistive element subassembly 531 when the grill is in the grill position, the object is seared by its contact with the first resistive element subassembly 531, to provide burn markings thereon characteristic of grilled food. Because the grill 520 includes two resistive element subassemblies 531, 533, adequate heat is generated by the resistive element subassemblies in the appropriate proportions, i.e., the first resistive element subassembly 531 produces sufficient heat to make grill markings on the object (and also to partially cook the object) and the second resistive element subassembly 533 produces sufficient heat to partially cook the object, to result in a fully cooked object.

Figure 18A:
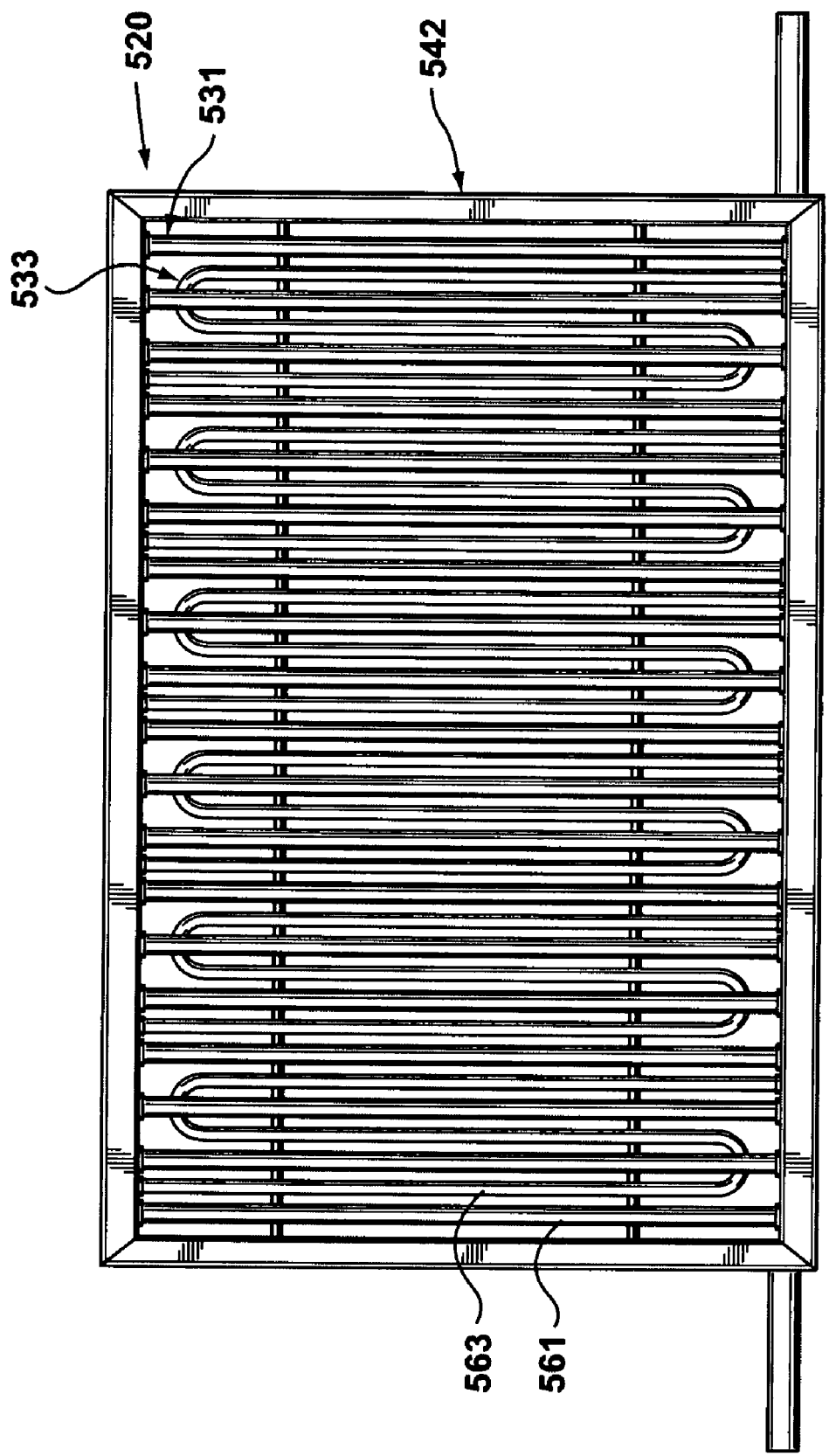
FIG. 18A is a top view of the barbecue grill of FIG. 17, drawn at a smaller scale.

As can be seen in FIG. 18A, it is also preferred that the first resistive element subassembly 531 includes a number of substantially straight first resistive element segments 561 positioned substantially parallel to each other and spaced apart from each other to define gaps 539 therebetween sized to permit liquid released from the object 21 during cooking to pass between the first resistive element segments 561 when the grill 520 is in the grill position.

In addition, the second resistive element subassembly 533 preferably includes a number of substantially straight second resistive element segments 563 which are substantially aligned respectively with the gaps 539, as will be described.

Figure 18B:
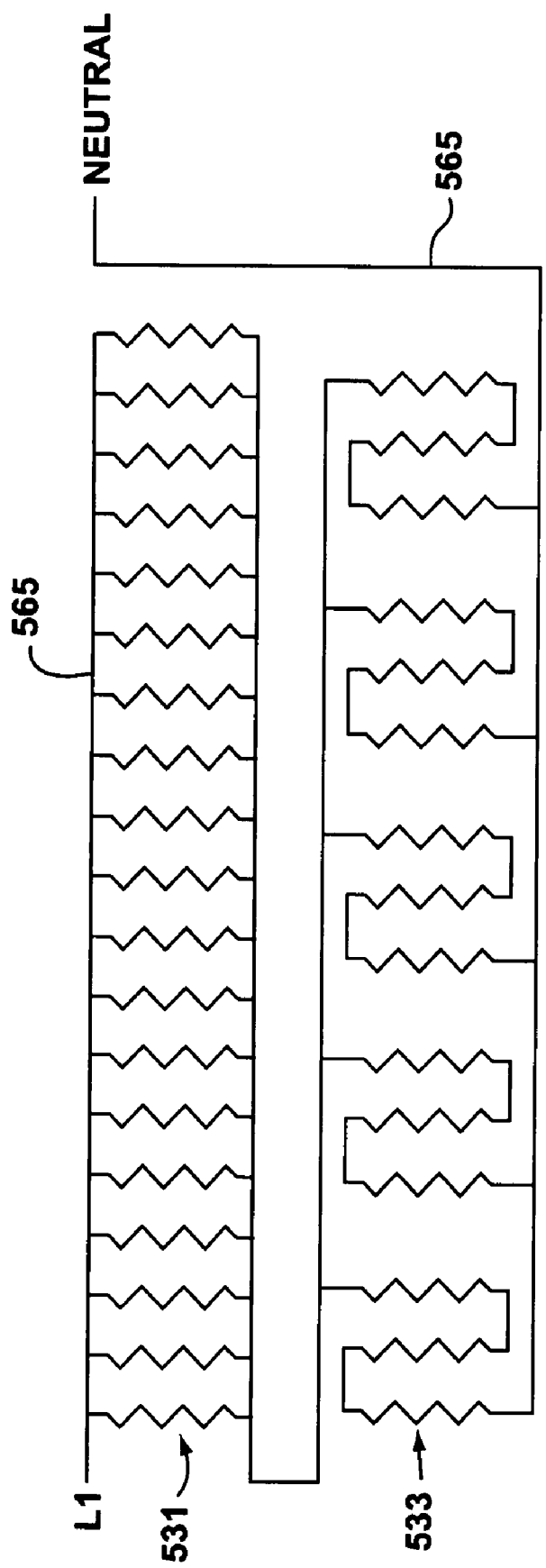
FIG. 18B is a circuit diagram schematically illustrating certain elements of the barbecue grill of FIG. 18A.
Figure 19:
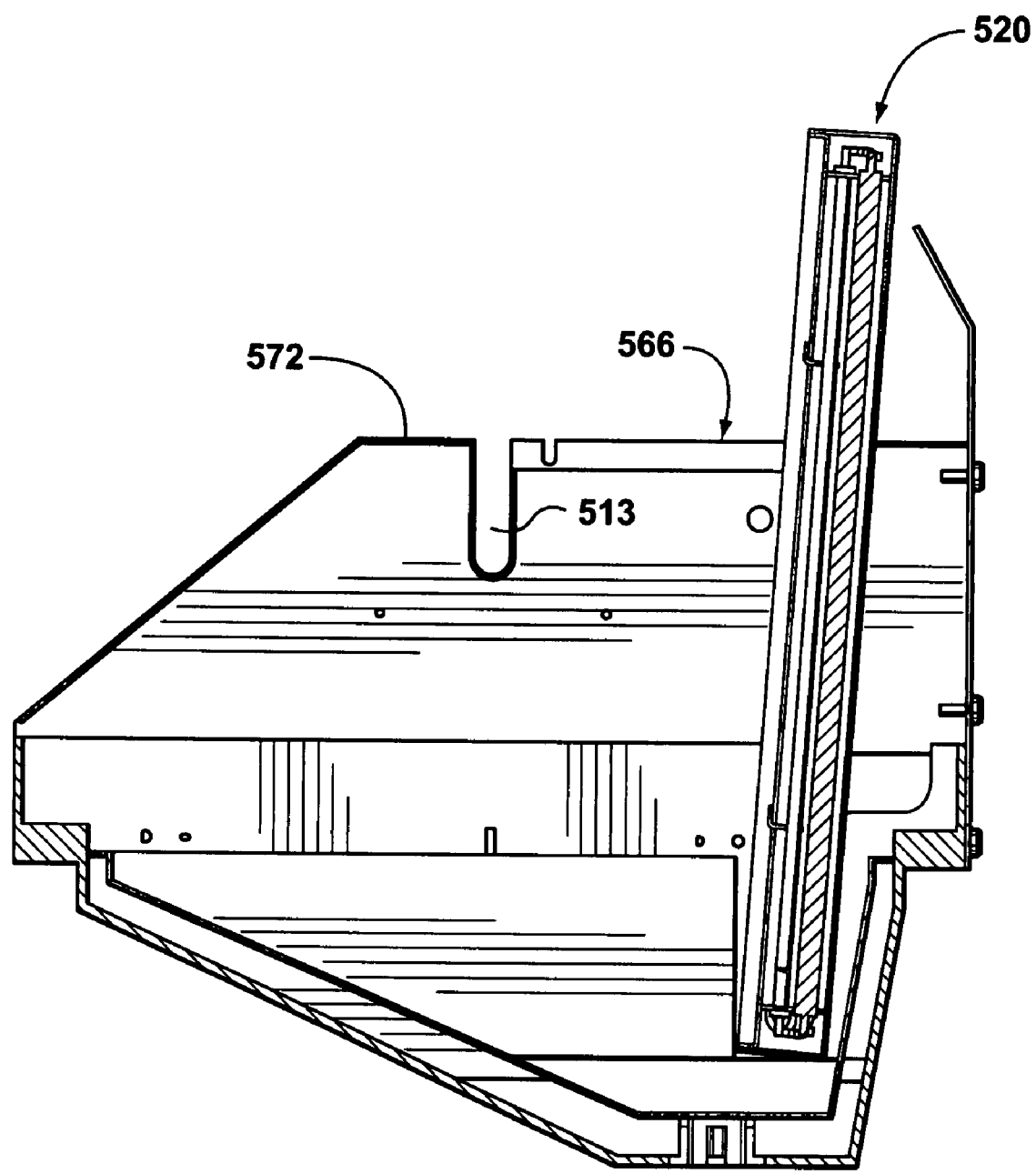
FIG. 19 is a partial cross-section of the barbecue assembly of FIG. 16, drawn at a larger scale.
Figure 20:
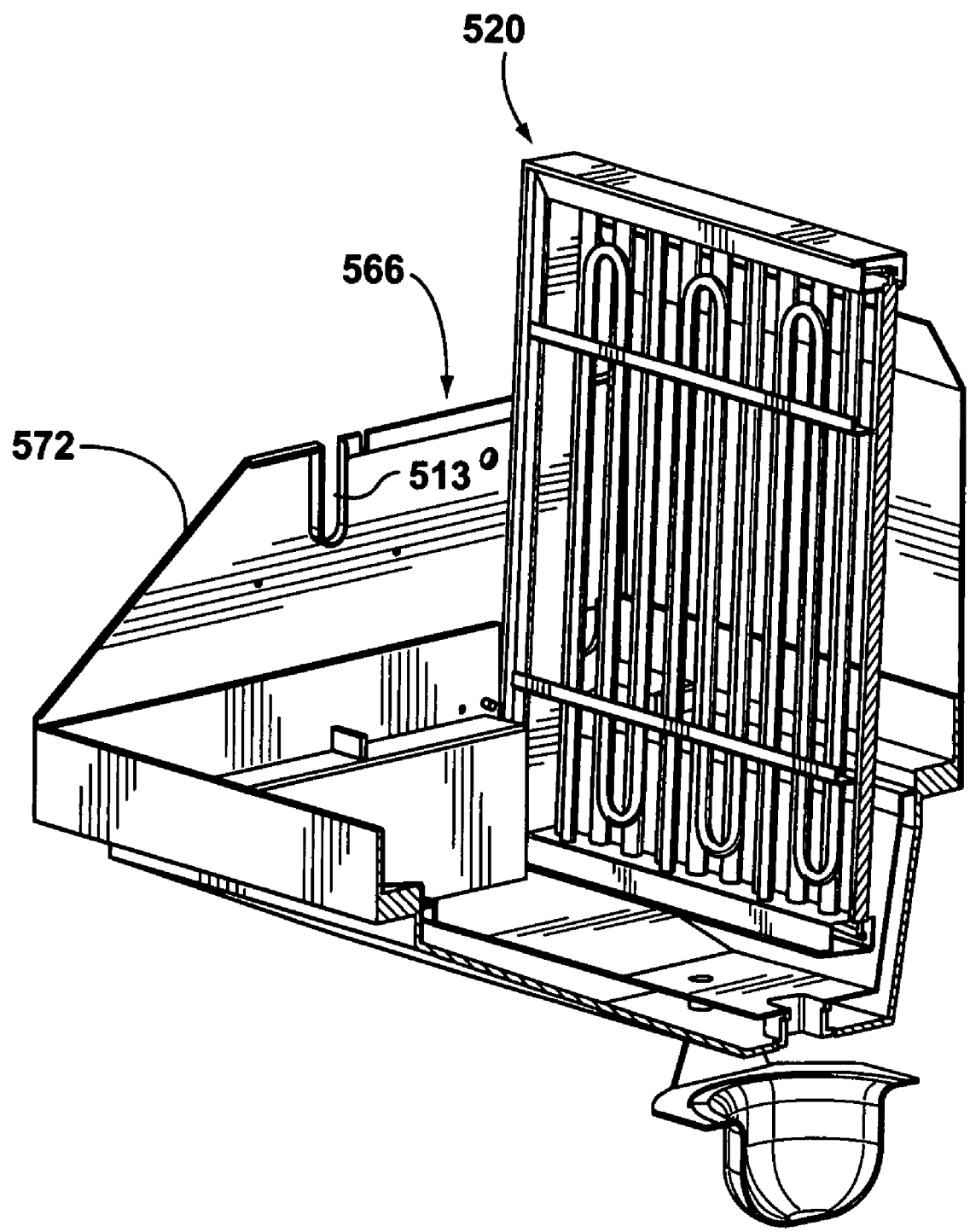
FIG. 20 is an isometric view (partially cut away) of the barbecue assembly of FIG. 16 showing the barbecue grill in the broil position, drawn at a smaller scale.

In one embodiment, the grill 520 includes one or more bus bars 565 positioned at least partially in the frame 542, for distributing electrical power to the first and second resistive element subassemblies 531, 533. Preferably, the bus bar 565 is electrically connected to the first and second resistive element subassemblies 531, 533 as represented in FIG. 18B. However, as will be appreciated by those skilled in the art, circuits other than the circuit represented in FIG. 18B may be used to provide electric power to the first and second resistive element subassemblies 531, 533. For example, other circuits could be used to focus the power to the first and second resistive element subassemblies independently (i.e., top and bottom), or laterally (i.e., front and back, or left side and right side), or any combinations thereof, as desired. Accordingly, in an alternative embodiment, the first and second resistive subassemblies 531, 533 are energizable independently of each other.

Figure 17A:
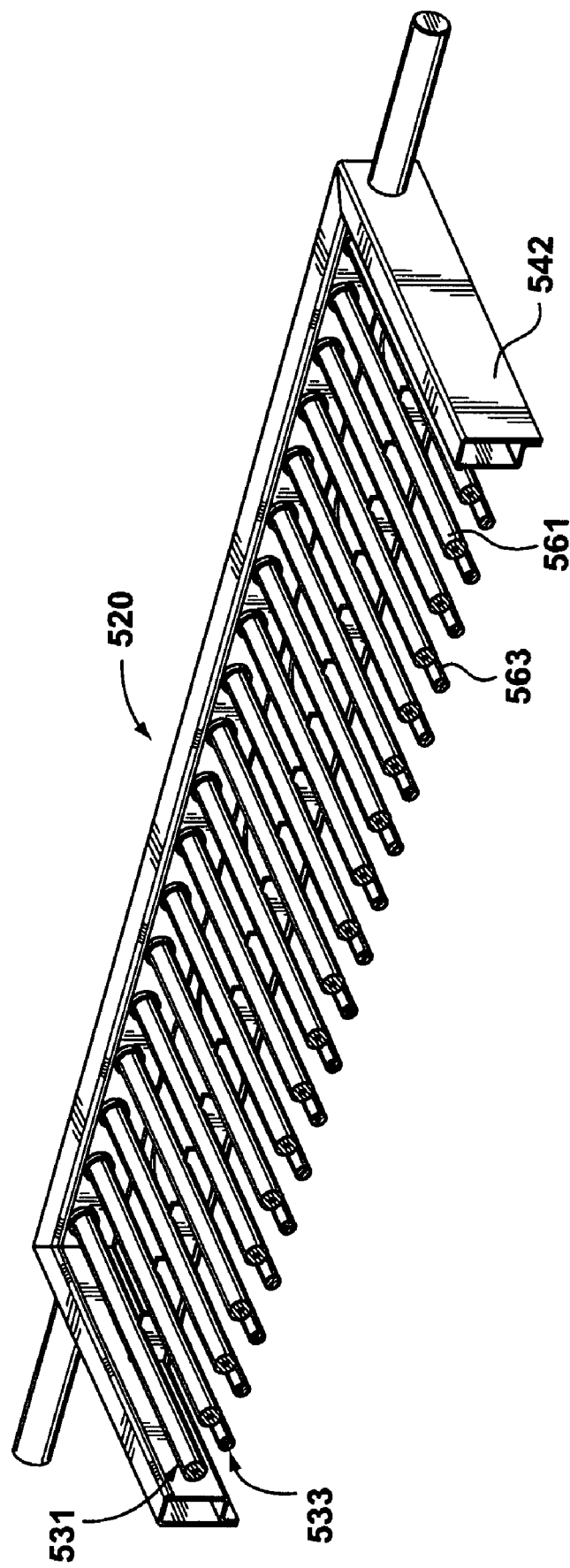
FIG. 17A is an isometric view (in partial cross-section) of the barbecue grill of FIG. 16.
Figure 17B:
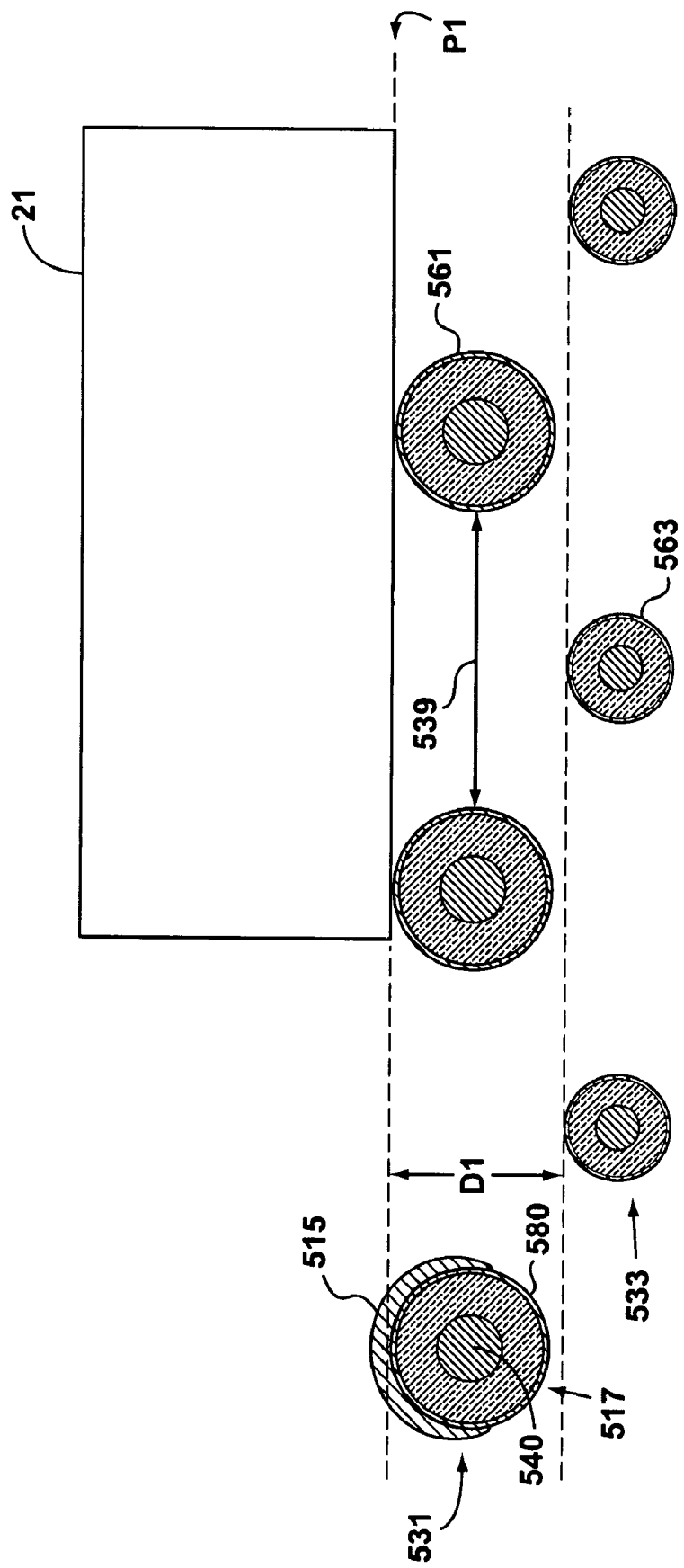
FIG. 17B is a cross-section of portions of the first and second resistive subassemblies, drawn at a larger scale.

Preferably, the grill is adapted for self-cleaning. As can be seen in FIG. 17B, a layer 515 of cooked material (e.g., grease, etc.) accumulates on sheaths 580 of individual elements 517. (For clarity of illustration, the layer 515 is shown on only one of the sheaths 580, but it will be understood that in practice all the sheaths accumulate such layers 515 on them over time, to a greater or a lesser extent.) In order to self-clean, the elements 517 are heated to a relatively high temperature (e.g., 650° F. or greater) for a relatively short time period (e.g., about 45 minutes, depending on materials). The ability to energize one portion of the grill independently of other parts thereof also facilitates self-cleaning.

The grill 520 is well-adapted for self-cleaning because the heat for self-cleaning is generated by the resistive element 540 inside the sheath 580, while the cooked material which is to be removed is on the outside of the sheath 580. In contrast, in attempting to self-clean a grill of the prior art, the grill elements therein typically do not have heat-generating elements positioned within them.

Preferably, the grill 520 is included in a barbecue assembly 564, as shown in FIGS. 15, 16, and 19-23. The barbecue assembly 564 includes a housing (or tub) 566 which preferably has slots 569 in walls 572 of the housing 566 (FIGS. 21, 23) to permit movement of the grill 520 between the grill position(s) and the broil position(s), as will be described.

The grill 520 preferably includes connector assemblies 573 (FIG. 24) on two opposing sides thereof (FIG. 18A). Each connector assembly 573 includes, among other things, one of the tubes 571 (FIG. 18A). Preferably, the tubes 571 extend outwardly from two opposing sides of the frame 542 (FIG. 18A). Each connector assembly 573 is for connecting the bus bar 565 to a source of electrical power (not shown) so that the grill 520 is easily movable between the grill position(s) and the broil position(s), as will be described.

Figure 24:
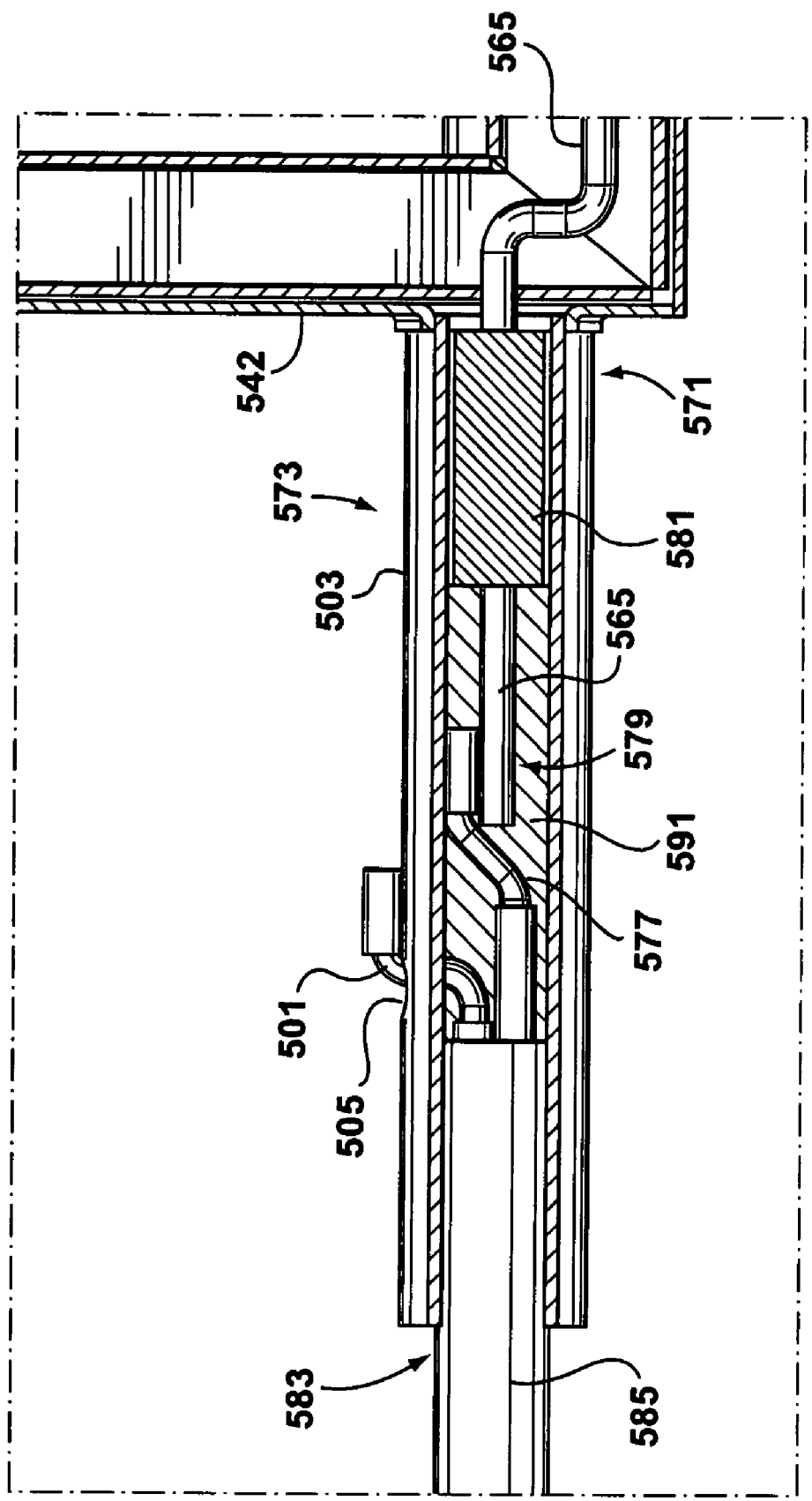
FIG. 24 is a cross-section of an embodiment of a connector assembly of the invention.

Preferably, the bus bar 565 is partially located in the tubes 571 respectively, to connect with supply wires 577 at respective supply connections 579 in the tubes 571 respectively (FIG. 24). Electric power is supplied from the source thereof via the supply wires 577, as is known in the art.

In one embodiment, and as can be seen in FIG. 24, each connector assembly 573 preferably also includes a thermal insulator 581 positioned in the tube 571 between the frame 542 and the supply connection 579. The thermal insulator 581 is for at least partially shielding the respective supply connections 579 from heat generated by the resistive element subassemblies 531, 533. Preferably, the thermal insulator 581 is made of any suitable thermal insulating material. In one embodiment, the thermal insulator 581 is made of a suitable thermoset plastic (e.g., phenol formaldehyde resin, sold under the trademark Bakelite), as is known in the art.

It is also preferred that, in each connector assembly 573, the supply wire 577 extends between the supply connection 579 and a supply wire subassembly 583. Each supply wire subassembly 583 includes a protective covering 585 in which the supply wire 577 and a ground wire 501 are at least partially positioned.

Preferably, and as can be seen in FIG. 24, in each connector assembly 573, the protective covering 585 is held substantially stationary relative to the tube 571 in which the protective covering 585 is located by a fastening material 591 which attaches the protective covering 585 to the tube 591. The attachment of the protective covering 585 to the tube 571 in this way is needed in order that the connector assembly 573 may pass "pull tests" which it is required to satisfy by regulative bodies in certain jurisdictions, as is known in the art.

Preferably, the tube 571 and the frame 542 are made of any suitable metal. For example, stainless steel is a suitable metal for these purposes. As shown in FIG. 24, the tube 571 has an exterior surface 503 to which the ground wire 501 is attached, for grounding. In addition, it is preferred that the tube 571 includes a hole 505. When the connector assembly 573 is assembled, the hole 505 allows the ground wire 501 to be pulled out of the tube 571 to the exterior surface 503 of the tube 571. Subsequently, the ground wire 501 is attached to the exterior surface by any suitable means (e.g., soldering), as is known in the art.

When the connector assembly 573 is assembled, the hole 505 preferably is also used for access, for injection of the fastening material 591 into the tube 571 between the protective covering 585 and the thermal insulator 581. It is preferred that the fastening material 591 is any suitable material for securely attaching the protective covering 585 to an interior surface 509 of the tube 571. Epoxy has been found to be a suitable fastening material 591, as epoxy is injectable to generally fill the tube 571 between the protective covering 585 and the thermal insulator 581, and provides a suitably secure bond between the protective covering 585 and the interior surface 509 of the tube 571 after curing thereof.

As can be seen in FIGS. 15 and 16, the barbecue assembly 564 preferably includes the grill 520. As described above, the grill 520 includes the first and second resistive element subassemblies 531, 533. The barbecue assembly 564 preferably also includes the housing 566 in which the barbecue grill 520 is mounted, for supporting the barbecue grill 520 in one or more predetermined positions, i.e., the grill position(s) and the broil position(s). (As shown, the assembly 564 provides for only one grill position and only one broil position, for clarity of illustration.) The grill 520 is shown in the grill position in FIGS. 15, 21, and 22. The grill 520 is shown in broil positions in FIGS. 16, 19, 20, and 23. As described, the grill 520 is energizable in the grill position and in the broil position.

Figure 21:
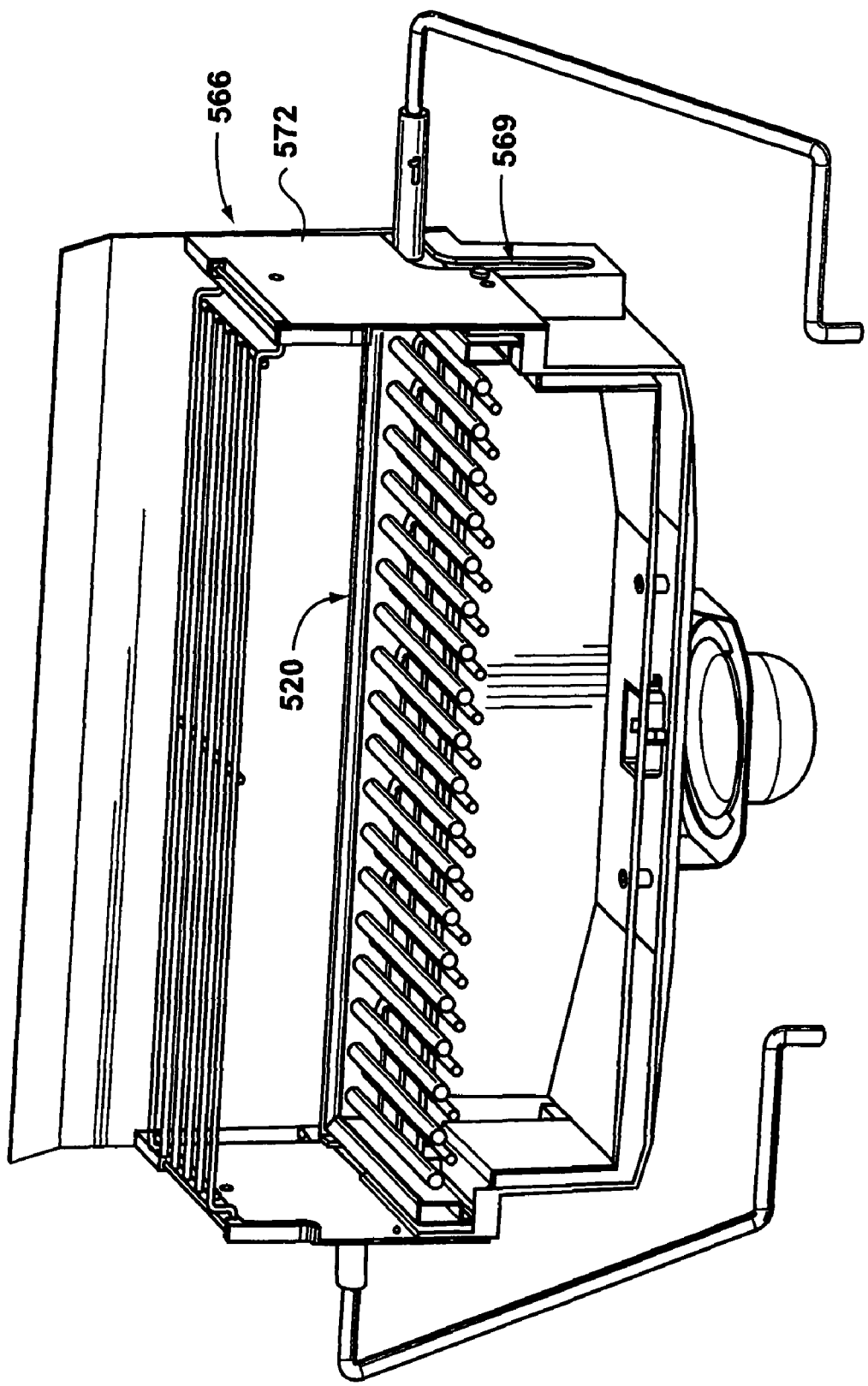
FIG. 21 is another isometric view (partially cut away) of the barbecue assembly of FIG. 15 showing the barbecue grill in the grill position, drawn at a smaller scale.
Figure 23:
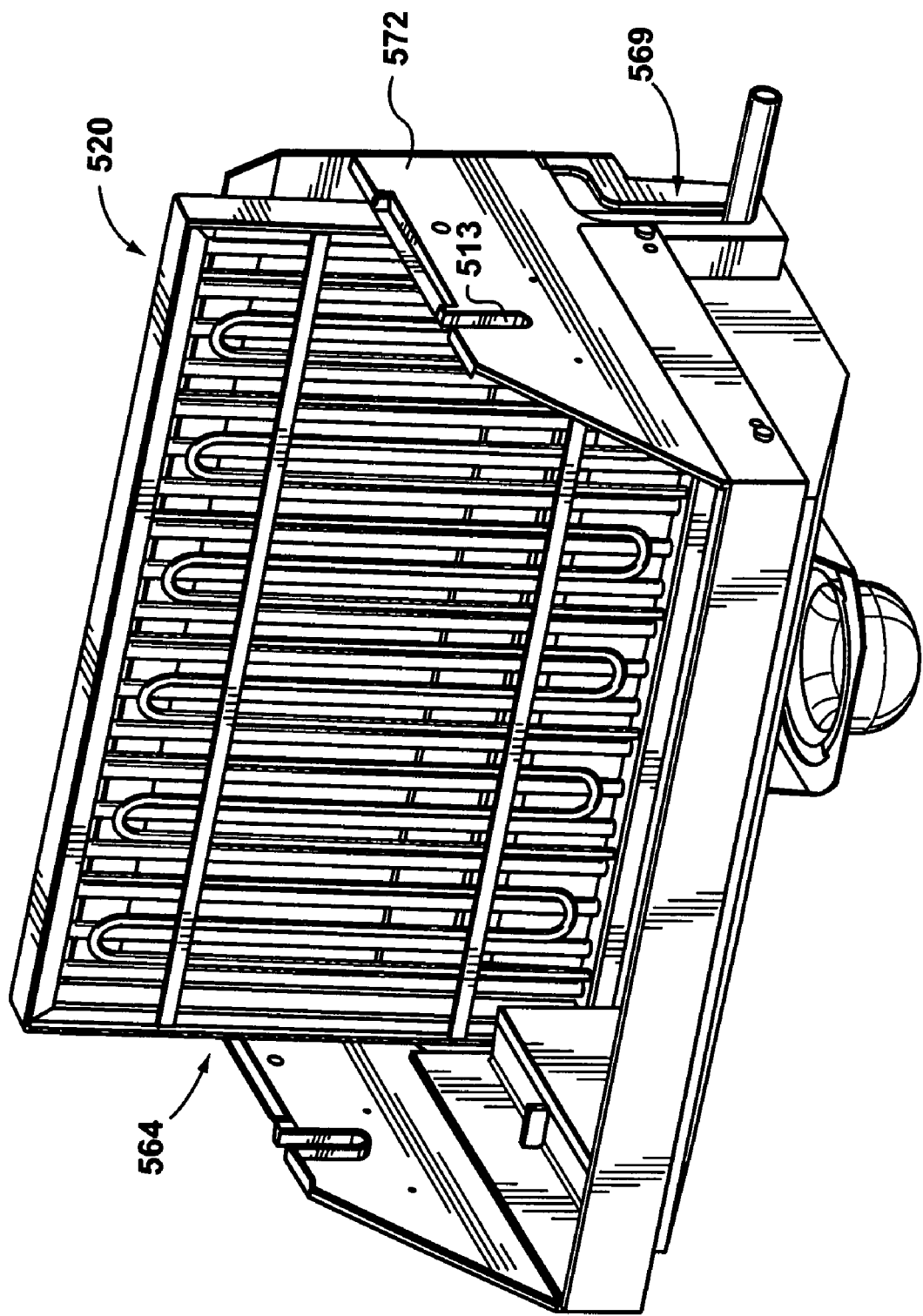
FIG. 23 is an isometric view of a portion of the barbecue assembly of FIG. 16 showing the barbecue grill in the broil position, drawn at a larger scale.

In use, when the grill 520 is in the grill position (FIG. 15), the tubes 571 are positioned in substantially horizontal portions 591 of the slots 569 on each side of the housing 566 (FIG. 21). (It will be understood that only one side of the housing 566 is shown in FIG. 21 for clarity of illustration. Similarly, when the grill 520 is in the broil position, the tubes 571 are at the bottom of vertical portions 599 of the slots 569 (FIG. 23). It can be seen, therefore, that the grill 520 can easily be moved by a user (not shown) from the grill position to the broil position and vice versa simply by lifting the frame 542 of the grill 520 as necessary in order to cause the tubes 571 to be moved in the slots 569 from the horizontal portion 593 to the vertical portion 599, and vice versa.

As shown in FIGS. 15 and 21, the barbecue assembly 564 includes a conventional rack 511, which is positioned above the grill 520 when the grill 520 is in the grill position. When the user wishes to move the grill 520 from the grill position to the broil position, the user preferably first removes the rack 511.

It will be understood that, when the grill 520 is in the broil position, the object to be cooked may be positioned as required relative to the grill 520 in any suitable manner. For example, as can be seen in FIGS. 16 and 23, the walls 572 preferably include slots 513 opening upwardly in which the ends of a spit (not shown) are receivable. As is known, the spit is positionable at the bottom of the slots 513 and rotatable therein so that the object may be cooked relatively uniformly throughout.

Figure 25:
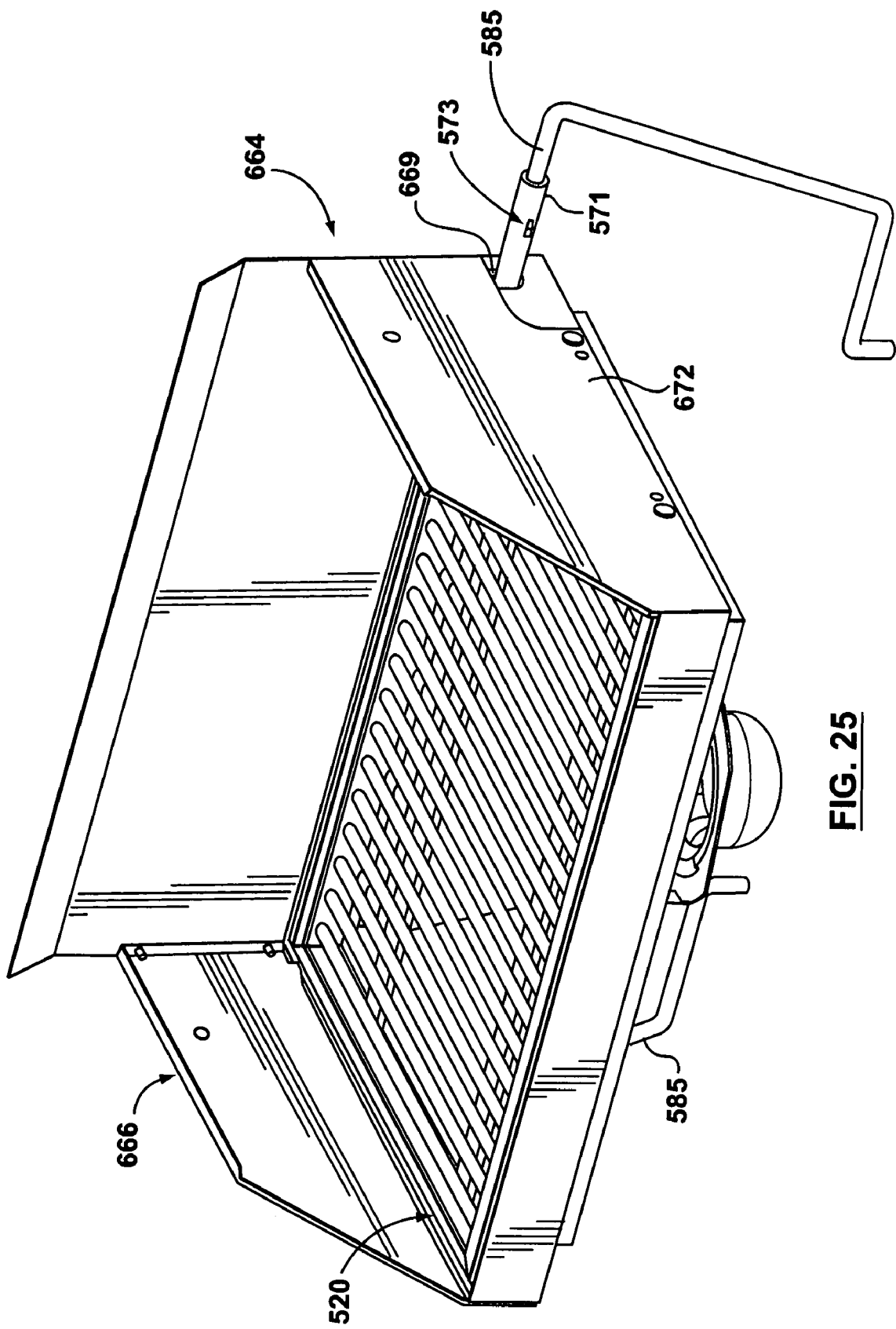
FIG. 25 is an isometric view of another alternative embodiment of the barbecue assembly of the invention showing the grill in the grill position, drawn at a smaller scale.
Figure 26:
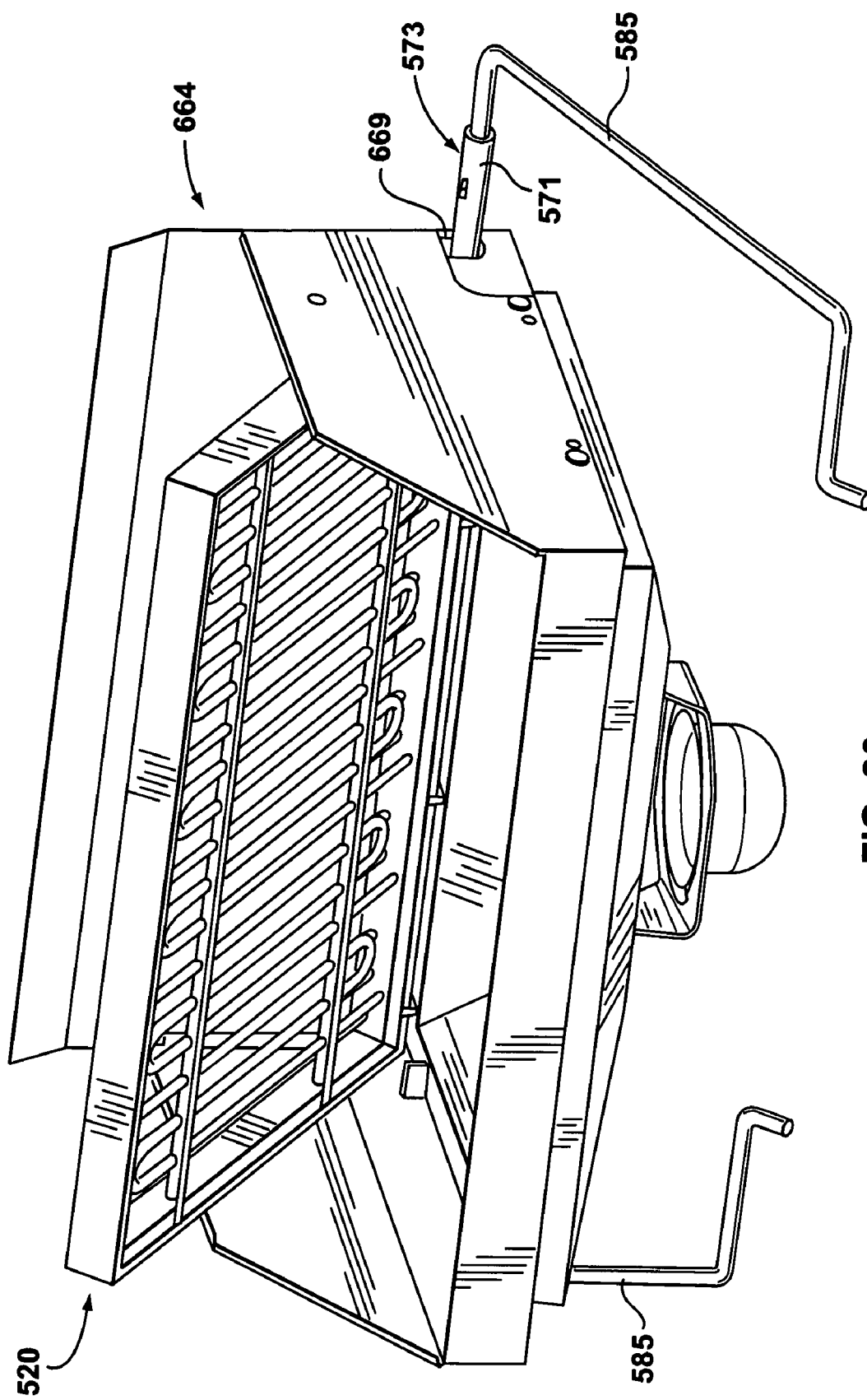
FIG. 26 is an isometric view of the barbecue assembly of FIG. 25 showing the grill in a raised position.

As can be seen in FIGS. 25 and 26, in another embodiment, the barbecue assembly 664 includes a housing 666 with walls 672 including holes 669 in which the tubes 571 are receivable, i.e., rather than the slots. In this assembly 664, the grill 520 is pivotable at its front end from the grill position (FIG. 25) upwardly to a raised position (FIG. 26). Preferably, the grill 520 is held in the raised position by any suitable means, as will be appreciated by those skilled in the art. The grill 520 is located in the raised position to permit cleaning of the housing.

It will be understood that, if the housing is constructed so to permit, then the grill may be positionable in a broil position as well when the tubes are positioned in holes in the housing wall.

It will also be understood that the barbecue assembly could include a barbecue grill 520 which is substantially fixed in place, e.g., in the grill position, if desired. In this embodiment, the connections of the bus bar and the supply wires could be made inside traditional terminal/junction boxes on either or both sides of the grill, as will be appreciated by those skilled in the art.

Any element in a claim that does not explicitly state "means for" performing a specific function, or "step for" performing a specific function, is not to be interpreted as a "means" or "step" clause as specified in 35 U.S.C. §112, paragraph 6.

It will be appreciated by those skilled in the art that the invention can take many forms, and that such forms are within the scope of the invention as claimed. Therefore, the spirit and scope of the appended claims should not be limited to the descriptions of the preferred versions contained herein.

We claim:

1. A barbecue grill for cooking an object, the barbecue grill comprising:
   a first resistive element subassembly energizable for generating heat to cook the object;
   a second resistive element subassembly energizable for generating heat to cook the object;
   the barbecue grill being movable between at least one grill position, in which the grill is located for grilling the object, and at least one broil position, in which the grill is located for broiling the object, the grill being energizable in said at least one grill position and in said at least one broil position;
   a frame to which the first and second resistive element subassemblies are attached such that the frame supports the first and second resistive element subassemblies;
   a bus bar positioned at least partially in the frame, for distributing electrical power to the first and second resistive element subassemblies; and
   the bus bar being partially located in tubes attached to two opposing sides of the frame respectively to connect with supply wires at respective supply connections in the tubes.

2. A barbecue grill according to claim 1 additionally comprising a thermal insulator positioned in each said tube respectively between the frame and the supply connection, for at least partially shielding the respective supply connections from heat generated by the resistive element subassemblies.

3. A barbecue grill according to claim 2 in which said supply wires extend between the respective supply connections and respective supply wire subassemblies, each said supply wire subassembly comprising a protective covering in which the supply wires are at least partially positioned, and each said protective covering is held substantially stationary relative to each said tube by a fastening material attaching each said protective covering to each said tube respectively.

4. A barbecue assembly for cooking an object, the barbecue assembly comprising:
   a barbecue grill comprising:
      a first resistive element subassembly energizable for generating heat to cook the object;
      a second resistive element subassembly energizable for generating heat to cook the object;
   a tub in which the barbecue grill is mounted, for supporting the barbecue grill in at least one predetermined position;
   a grill frame movable relative to the tub to which the resistive element subassemblies are attached, for supporting the resistive subassemblies;
   a bus bar at least partially positioned in the grill frame, for distributing electrical power to the first and second resistive element subassemblies; and
   the bus bar being partially located in tubes attached to two opposing sides of the grill frame respectively to connect with supply wires at respective supply connections in the tubes.

5. A barbecue assembly according to claim 4 additionally comprising a thermal insulator positioned in each said tube respectively between the frame and the supply connection, for at least partially shielding the respective supply connections from heat generated by the resistive element subassemblies.

6. A barbecue assembly according to claim 5 in which said supply wires extend between the respective supply connections and respective supply wire subassemblies, each said supply wire subassembly comprising a protective covering in which the supply wires are at least partially positioned, and each said protective covering is held substantially stationary relative to each said tube by a fastening material attaching each said protective covering to each said tube respectively.

* * * * *